United States Patent
Matsukawa et al.

(10) Patent No.: US 6,433,958 B1
(45) Date of Patent: Aug. 13, 2002

(54) MAGNETIC HEAD, METHOD FOR PRODUCING THE SAME, VIDEO RECORDING AND REPRODUCTION APPARATUS INCLUDING THE MAGNETIC HEAD, AND VIDEO CAMERA INCLUDING THE MAGNETIC HEAD

(75) Inventors: Nozomu Matsukawa, Yamatokoriyama; Masayoshi Hiramoto, Ikoma; Hiroshi Sakakima, Kyotanabe; Koichi Osano, Osaka; Eisuke Sawai, Kyoto, all of (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 46 days.

(21) Appl. No.: 09/625,687

(22) Filed: Jul. 26, 2000

(30) Foreign Application Priority Data

Jul. 27, 1999 (JP) .................................. 11-212911

(51) Int. Cl.$^7$ .......................... G11B 5/235; G11B 5/133
(52) U.S. Cl. ........................................ 360/120; 360/127
(58) Field of Search ............................... 360/120, 127, 360/125, 126

(56) References Cited

U.S. PATENT DOCUMENTS 5,031,063 A * 7/1991 Hasegawa .................. 360/120
5,173,823 A * 12/1992 Hasegawa .................. 360/120

FOREIGN PATENT DOCUMENTS

JP 10-223435 8/1998

* cited by examiner

Primary Examiner—Robert S. Tupper
(74) Attorney, Agent, or Firm—Renner, Otto, Boisselle & Sklar, LLP

(57) ABSTRACT

A magnetic head includes a pair of magnetic core halves; and a nonmagnetic layer provided between the pair of magnetic core halves for combining the pair of magnetic core halves. The pair of magnetic core halves each includes an oxide magnetic base, at least one underlying layer provided on the oxide magnetic base, and a metal magnetic thin film provided between the underlying film and the nonmagnetic layer. The metal magnetic thin film includes a magnetic film containing, as a major material, magnetic crystalline particles having an average volume Va and an average surface area Sa fulfilling the relationship of Sa>about 4.84 $Va^{2/3}$. At least one of the pair of magnetic core halves has a winding window therein. The metal magnetic thin film is provided in such a manner as to prevent the oxide magnetic base from cracking due to an internal stress generated in the metal magnetic thin film.

25 Claims, 19 Drawing Sheets

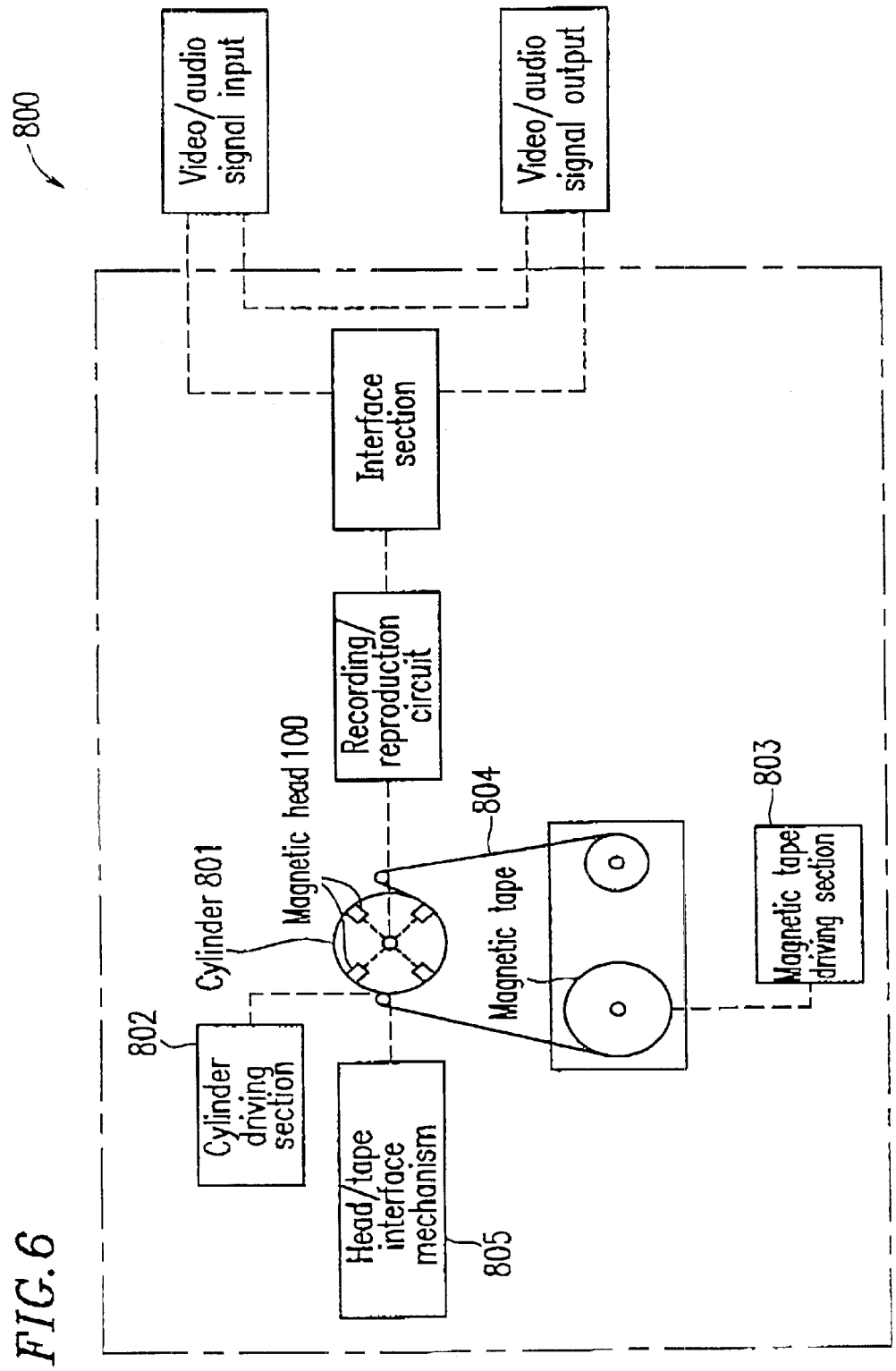

MAGNETIC HEAD, METHOD FOR PRODUCING THE SAME, VIDEO RECORDING AND REPRODUCTION APPARATUS INCLUDING THE MAGNETIC HEAD, AND VIDEO CAMERA INCLUDING THE MAGNETIC HEAD

BACKGROUND OF THE INVENTION

1. Field of the Invention

The present invention relates to a magnetic head which is satisfactory in the anti-corrosion characteristic and the input and output characteristic, and is sufficiently durable against cracking in a base thereof; a method for producing the magnetic head; a video recording and reproduction apparatus including the magnetic head, and a video camera including the magnetic head.

2. Description of the Related Art

As a magnetic head for VCRs or the like, a ferrite head including a magnetic core formed by combining a pair of ferrite sections together is conventionally used. Recently, in accordance with the improvement in the magnetic recording density, a metal-in-gap head (MIG head) has become often used. The MIG head uses a metal magnetic material having a more highly saturated magnetic flux density than that of ferrite for a portion in the vicinity of a recording/reproduction gap.

FIG. 8 schematically shows an exemplary conventional ferrite head 300. FIGS. 9A through 9D schematically show an exemplary conventional MIG head 400.

With reference to FIG. 8, the ferrite head 300 includes a pair of ferrite sections F1A and F1B, and a nonmagnetic layer N1 and glass bonding sections G1 both provided between the pair of ferrite sections F1A and F1B for combining the ferrite sections F1A and F1B.

With reference to FIGS. 9A through 9D, the MIG head 400 includes a pair of magnetic core halves MCA and MCB, and a nonmagnetic layer N2 and glass bonding sections G2 both provided between the pair of magnetic core halves MCA and MCB for combining the magnetic core halves MCA and MCB. The magnetic core half MCA includes a ferrite section F2A, at least one underlying layer (not shown) provided on the ferrite section F2A, and a metal magnetic thin film FM2 provided between the underlying layer and the nonmagnetic layer N2. The magnetic core half MCB includes a ferrite section F2B, at least one underlying layer (not shown) provided on the ferrite section F2B, and a metal magnetic thin film FM2 provided between the underlying layer and the nonmagnetic layer N2.

As a material for the metal magnetic thin films FM2, amorphous materials (e.g., Japanese Laid-Open Publication No. 63-120653), Fe-N-based materials, and Fe-C-based materials have been developed. The Fe-N-based materials and Fe-C-based materials are obtained by thermally treating an amorphous film mainly containing Fe to deposit microscopic crystals having a diameter of about 5 to about 20 nm (e.g., Hasegawa, Journal of the Magnetics Society of Japan, 14, pp. 319–322 (1990); and Nago, IEEE, Trans., Magn., Vol. 28, No. 5 (1992)).

Among these materials, materials obtained by depositing or growing microscopic crystalline particles having a magnetic metal composition and thus having a highly saturated magnetic flux density of 1.2 T or higher and a soft magnetic characteristic need to be improved in the anti-corrosion characteristic.

For this purpose, attempts have been made to add light elements having passivity to these materials. However, the light elements, which easily react with oxygen, nitrogen and the like, react with oxygen used for making crystals amorphous or microscopic and thus tend not to remain in the microscopic crystalline particles having the magnetic metal composition.

In order to overcome this problem, in addition to adding the light elements having passivity to the above-mentioned metal magnetic materials, the magnetic crystalline particles of these materials are each controlled to have a relatively large size and a relatively large surface area. The metal magnetic thin film thus developed has satisfactory magnetic characteristics, a highly saturated magnetic flux density, and a sufficient anti-corrosion characteristic (e.g., Japanese Laid-Open Publication No. 10-223435).

An MIG head is a composite device of ferrite, which is an oxide, and a metal magnetic thin film. Accordingly, the MIG head involves the problems that the ferrite base may be cracked by an internal stress generated in the metal magnetic thin film and that the magnetic characteristics may be deteriorated by a reaction at the interface between the ferrite base and the metal magnetic thin film. The above-mentioned problems are caused by the structure of the MIG head or the material characteristics of the metal magnetic thin film.

An optimum structure of a magnetic head varies in accordance with the material characteristics of the metal magnetic thin film. In order to improve the characteristics of the magnetic head, it is necessary to solve the problems of the cracks in the ferrite base and the deterioration of the magnetic characteristics as well as to improve the materials design.

SUMMARY OF THE INVENTION

According to one aspect of the invention, a magnetic head includes a pair of magnetic core halves; and a nonmagnetic layer provided between the pair of magnetic core halves for combining the pair of magnetic core halves. The pair of magnetic core halves each includes an oxide magnetic base, at least one underlying layer provided on the oxide magnetic base, and a metal magnetic thin film provided between the underlying film and the nonmagnetic layer. The metal magnetic thin film includes a magnetic film containing, as a major material, magnetic crystalline particles having an average volume Va and an average surface area Sa fulfilling the relationship of Sa>about $4.84 \, Va^{2/3}$. At least one of the pair of magnetic core halves has a winding window therein. The metal magnetic thin film is provided in such a manner as to prevent the oxide magnetic base from cracking due to an internal stress generated in the metal magnetic thin film.

In one embodiment of the invention, the metal magnetic thin film includes magnetic crystalline particles, which have an average length of a longer side of more than about 50 nm.

In one embodiment of the invention, the magnetic crystalline particles have at least one shape selected from the group consisting of a generally needle-like shape, a generally column-like shape, and a multiple-branch shape including the magnetic crystalline particles of the generally needle-like shape and the generally column-like shape; and the magnetic crystalline particles having the generally needle-like shape and the generally column-like shape have an average length of a shorter side of more than about 5 nm and less than about 60 nm.

In one embodiment of the invention, where dS is an average length of a shorter side of the magnetic crystalline particles and dL is an average length of a longer side of the magnetic crystalline particles, 5 nm<dS<60 nm and 60 nm<dL<5000 nm.

In one embodiment of the invention, the metal magnetic thin film has a composition represented by $(M_aX_bZ_c)_{100-d}A_d$, where M includes at least one magnetic metal element selected from the group consisting of Fe, Co and Ni; X includes at least one element selected from the group consisting of Si, Al, Ga and Ge; Z includes at least one element selected from the group consisting of elements of group IVa, elements of group Va, Al, Ga and Cr; A includes at least one element selected from the group consisting of O and N; and a, b, c and d fulfill the relationships of about $0.1 \leq b \leq$ about 26, about $0.1 \leq c \leq$ about 5, a+b+c=100, and about $1 \leq d \leq$ about 10.

In one embodiment of the invention, the pair of magnetic core halves each have a combining surface which is combined with the other magnetic core half with the nonmagnetic layer interposed therebetween, a recording medium running surface on which a recording medium runs, and outer side surfaces continuous from the combining surface and from the recording medium running surface; and the metal magnetic thin film is not provided on the outer side surfaces.

In one embodiment of the invention, the metal magnetic thin film has a composition represented by $(Fe_aSi_bAl_cT_d)_{100-a}N_e$ where T includes at least one element selected from the group consisting of Ti and Ta; and a, b, c, d and e fulfill the relationships of about $10 \leq b \leq$ about 23, about $0.1 \leq d \leq$ about 5, about $0.1 \leq c+d \leq$ about 8, a+b+c+d=100, and about $1 \leq e \leq$ about 10.

In one embodiment of the invention, z includes at least one element selected from the group consisting of elements of group IVa, elements of group Va and Cr.

In one embodiment of the invention, X includes at least one element selected from the group consisting of Si and Ge; and a, b, c and d fulfill the relationships of about $0.1 \leq b \leq$ about 23, about $0.1 \leq c \leq$ about 8, a+b+c=100, and about $1 \leq d \leq$ about 10.

In one embodiment of the invention, the metal magnetic thin film has a composition represented by $(Fe_aSi_bAl_cT_d)_{100-e-f}N_eO_f$ where a, b, c, d, e and f fulfill the relationships of about $10 \leq b \leq$ about 23, about $0.1 \leq d \leq$ about 5, about $0.1 \leq c+d \leq$ about 8, a+b+c+d=100, and about $1 \leq e+f \leq$ about 10, and $0.1 \leq f \leq$ about 5.

In one embodiment of the invention, the at least one underlying layer contains at least one of an oxide of Al, and oxide of Si, a nitride of Al, a nitride of Si, and a mixture thereof.

In one embodiment of the invention, the at least one underlying layer includes a first underlying layer in contact with the magnetic core half and a second underlying layer in contact with the metal magnetic thin film. The first underlying layer contains at least one of an oxide of Al, an oxide of Si, a nitride of Al, a nitride of Si, and a mixture thereof. The metal magnetic thin film contains at least one of oxygen and nitrogen; and the second underlying layer contains an element which is a main component of the metal magnetic thin film, and at least one of oxygen and nitrogen in a larger amount than the amount contained in the metal magnetic thin film. The second underlying layer contains crystalline particles. The crystalline particles have an average particle diameter of about 5 nm or less at least in the vicinity of an interface between the first underlying layer and the second underlying layer.

In one embodiment of the invention, the first underlying layer contains an oxide of Al, and has a thickness of about 0.5 nm or more and about 4 nm or less. The second underlying layer has a thickness of about 0.5 nm or more and about 200 nm or less.

In one embodiment of the invention, the oxide magnetic base of each of the magnetic core halves contains a ferrite single crystal. The ferrite single crystal has a combining surface corresponding to a combining surface of the magnetic core half which is combined with the other magnetic core half with the nonmagnetic layer interposed therebetween, and a recording medium running surface on which a recording medium runs.

In one embodiment of the invention, the ferrite single crystal includes an MnZn ferrite single crystal containing A mol % of $Fe_2O_3$, B mol % of MnO and C mol % of ZnO, where A, B and C fulfill the relationships of about $52 \leq A \leq$ about 57, about $5 \leq B \leq$ about 29, and about $16 \leq C \leq$ about 21.

In one embodiment of the invention, the pair of magnetic core halves each have a combining surface which is combined with the other magnetic core half with the nonmagnetic layer interposed therebetween, and a recording medium running surface on which a recording medium runs. At least one of the pair of magnetic core halves has a bottom surface and a first inner side surface for forming the winding window. The first inner side surface extends from the bottom surface toward the combining surface and is provided on the side of the recording medium running surface with respect to the bottom surface. An angle made by the first inner side surface and the combining surface is about 22.5° or more and about 70° or less.

In one embodiment of the invention, the winding window is provided in one of the pair of magnetic core halves, and the angle made by the first inner side surface and the combining surface is about 45° or more and about 70° or less.

In one embodiment of the invention, the winding window is provided in both of the pair of magnetic core halves, and the angle made by the first inner side surface and the combining surface is about 22.5° or more and about 50° or less.

In one embodiment of the invention, the first inner side surface includes a second inner side surface adjacent to the combining surface and a third inner side surface adjacent to the bottom surface. An angle made by the second inner side surface and the combining surface is about 22.5° or more and about 70° or less. An angle made by the third inner side surface and the bottom surface is about 90°.

In one embodiment of the invention, the winding window is provided in one of the pair of magnetic core halves, and the angle made by the second inner side surface and the combining surface is about 45° or more and about 70° or less.

In one embodiment of the invention, the winding window is provided in both of the pair of magnetic core halves, and the angle made by the second inner side surface and the combining surface is about 22.5° or more and about 50° or less. In one embodiment of the invention, the metal magnetic thin film has a composition represented by $(Fe_aSi_bAl_cTi_d)_{100-e-f}N_eO_f$, where a, b, c, d, e and f fulfill the relationships of about $10 \leq b \leq$ about 13, about $1 \leq c \leq$ about 3, about $1 \leq d \leq$ about 3, a+b+c+d=100, about $4 \leq e+f \leq$ about 10, and about $0.1 \leq f \leq$ about 2.

In one embodiment of the invention, the oxide magnetic base of each of the magnetic core halves has a combining surface which is combined with the oxide magnetic base of the other magnetic core half with the nonmagnetic layer interposed therebetween, and side surfaces continuous from the combining surface. An angle made by the combining surface and each of the side surfaces is about 70° or more and about 90° or less. The metal magnetic thin film is provided on the combining surface but is not provided on the side surfaces.

According to another aspect of the invention, a method for producing a magnetic head is provided. The magnetic head includes a pair of magnetic core halves, and a nonmagnetic layer provided between the pair of magnetic core halves for combining the pair of magnetic core halves. The pair of magnetic core halves each include an oxide magnetic base, at least one underlying layer provided on the oxide magnetic base, and a metal magnetic thin film provided between the underlying layer and the nonmagnetic layer. The metal magnetic thin film includes a magnetic film containing, as a major material, magnetic crystalline particles having an average volume Va and an average surface area Sa fulfilling the relationship of Sa>about 4.84 $Va^{2/3}$. At least one of the pair of magnetic core halves has a winding window therein, and the metal magnetic thin film is provided in such a manner as to prevent the oxide magnetic base from cracking due to an internal stress generated in the metal magnetic thin film; wherein the metal magnetic thin film has a composition represented by $(M_aX_bZ_c)_{100-d}A_d$, where M includes at least one magnetic metal element selected from the group consisting of Fe, Co and Ni, X includes at least one element selected from the group consisting of Si, Al, Ga and Ge, Z includes at least one element selected from the group consisting of elements of group IVa, elements of group Va, Al, Ga and Cr, and A includes at least one element selected from the group consisting of O and N, and a, b, c and d fulfill the relationships of about $0.1 \leq b \leq$ about 26, about $0.1 \leq c \leq$ about 5, a+b+c=100, and about $1 \leq d \leq$ about 10. The metal magnetic thin film includes magnetic crystalline particles, the magnetic crystalline particles having at least one shape selected from the group consisting of a generally needle-like shape, a generally column-like shape, and a multiple-branch shape combining the generally needle-like shape and the generally column-like shape; and the magnetic crystalline particles have an average length dS of a shorter side of about 5 nm<dS<about 60 nm and an average length of a longer side of about 60 nm<dL<about 5000 nm. The method includes a winding window formation step of forming a winding window in at least one of a pair of oxide magnetic plates which are generally flat; an underlying layer formation step of forming at least one underlying layer on each of the pair of oxide magnetic plates; a metal magnetic thin film formation step of forming the metal magnetic thin film on the underlying layer, the metal magnetic thin film being formed using a solid material containing an element which is a main component of the metal magnetic thin film in an atmosphere containing at least one of oxygen and nitrogen by a gas phase technique; a track formation step of forming a groove in a body including the oxide magnetic plate, the underlying layer, and the metal magnetic thin film so that the groove has a width corresponding to a track; and a combining step of combining the body with another body including an oxide magnetic plate, an underlying layer, and a metal magnetic thin film, with the nonmagnetic layer interposed therebetween.

In one embodiment of the invention, the steps are performed in the order of the winding window formation step, the underlying layer formation step, the metal magnetic thin film formation step, the track formation step, and then the combining step.

In one embodiment of the invention, the steps are performed in the order of the underlying layer formation step, the metal magnetic thin film formation step, the winding window formation step, the track formation step, and then the combining step.

According to still another aspect of the invention, a video recording and reproduction apparatus includes a cylinder having any of the above-defined magnetic heads mounted thereon; a head/tape interface mechanism for winding a magnetic tape around the cylinder; a cylinder driving section for driving the cylinder; and a magnetic tape driving section for driving the magnetic tape wound around the cylinder.

According to still another aspect of the invention, a video camera includes a cylinder having any of the above-defined magnetic heads; a head/tape interface mechanism for winding a magnetic tape around the cylinder; a cylinder driving section for driving the cylinder; a magnetic tape driving section for driving the magnetic tape wound around the cylinder; an optical system for converting a video signal into an electric signal; and a signal processing circuit for outputting the electric signal obtained by conversion by the optical system to the magnetic head.

Thus, the invention described herein makes possible the advantages of providing a magnetic head which (i) is satisfactory in the anti-corrosion characteristic and an input and output characteristic and is sufficiently durable against cracking in a base and (ii) has an optimum combination of a metal magnetic thin film and a head structure; a method for producing the magnetic head; a video recording and reproduction apparatus including the magnetic head; and a video camera including the magnetic head.

These and other advantages of the present invention will become apparent to those skilled in the art upon reading and understanding the following detailed description with reference to the accompanying figures.

BRIEF DESCRIPTION OF THE DRAWINGS

FIG. 6 is a block diagram showing a structure of a video recording and reproduction apparatus in a third example according to the present invention;

DESCRIPTION OF THE PREFERRED EMBODIMENTS

Figure 1A:
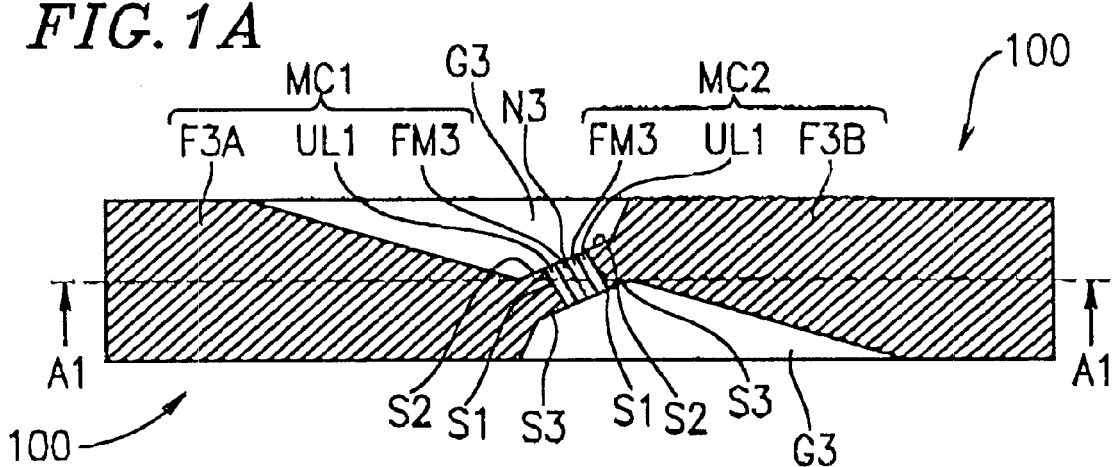
FIG. 1A is a view of a surface of a magnetic head in a first example according to the present invention, on which a recording tape runs.

Hereinafter, the present invention will be described by way of illustrative examples with reference to the accompanying drawings. Throughout the specification, identical elements bear identical reference numerals and the descriptions thereof will not be repeated.

EXAMPLE 1

Figure 1B:
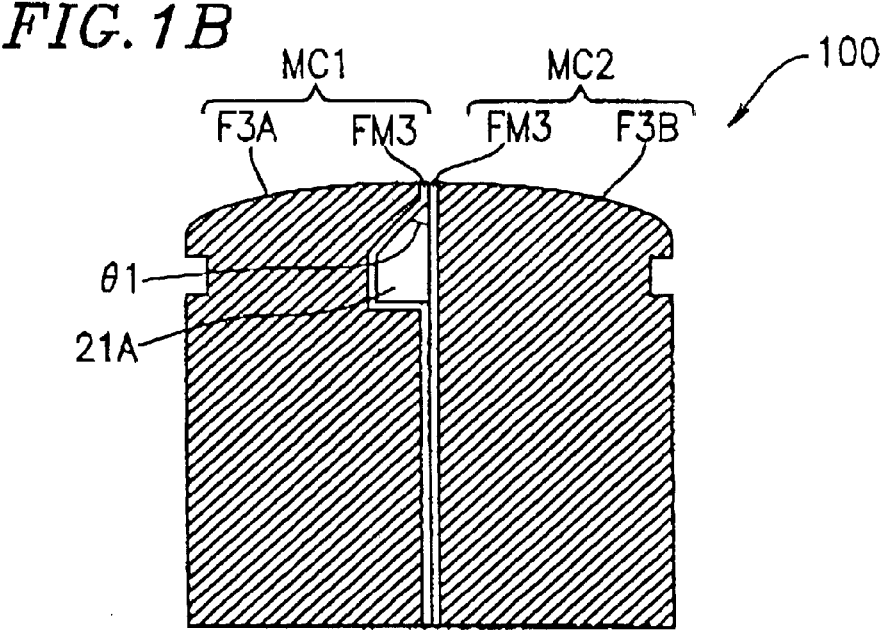
FIG. 1B is a cross-sectional view taken along line A1—A1 in FIG. 1A.

FIGS. 1A and 1B schematically show a magnetic head 100 in a first example according to the present invention. FIG. 1A is a view of a surface of the magnetic head 100, on which a recording tape runs (hereinafter, referred to as a "tape running surface"). FIG. 1B is a cross-sectional view taken along line A1—A1 in FIG. 1A.

With reference to FIGS. 1A and 1B, the magnetic head 100 includes a pair of magnetic core halves MC1 and MC2, and a nonmagnetic layer N3 and glass bonding sections G3 both provided between the pair of magnetic core halves MC1 and MC2 for combining the magnetic core halves MC1 and MC2. The magnetic core half MC1 includes a ferrite section F3A, at least one underlying layer UL1 (FIG. 1A) provided on the ferrite section F3A, and a metal magnetic thin film FM3 provided between the underlying layer UL1 and the nonmagnetic layer N3. The magnetic core half MC2 includes a ferrite section F3B, at least one underlying layer UL1 (FIG. 1A) provided on the ferrite section F3B, and a metal magnetic thin film FM3 provided between the underlying layer UL1 and the nonmagnetic layer N3. The magnetic core half MC1 has a winding window 21A.

With reference to FIG. 1A, the ferrite sections F3A and F3B each include a combining surface S1 facing the nonmagnetic layer N3 and outer side surfaces S2 and S3 continuous from the combining surface S1. In each of the ferrite sections F3A and F3B, the metal magnetic thin film FM3 is provided only on the combining surface S1 with the underlying layer UL1 interposed therebetween, and is not provided on the outer side surfaces S2 or S3 for the following reason. An angle made by the combining surface S1 and each of the side surfaces S2 and S3 is about 70° or more and about 90° or less.

In the case where the metal magnetic thin film FM3 is provided on the outer side surfaces S2 and S3, an undesirable internal stress is generated in the metal magnetic thin film FM3 provided on the outer side surfaces S2 and S3. Such an internal stress causes cracks in the ferrite sections F3A and F3B. The metal magnetic thin film FM3 is provided in such a manner that the ferrite sections F3A and F3B are not cracked due to the undesirable internal stress. Each of the ferrite sections F3A and F3B includes a ferrite single crystal, for example, an MnZn ferrite single crystal. The MnZn ferrite single crystal includes A mol % of $Fe_2O_3$, B mol % of MnO and C mol % of ZnO, where A, B and C fulfill the relationships of about $52 \leq A \leq$ about 57, about $5 \leq B \leq$ about 29, and about $16 \leq C \leq$ about 21. The MnZn ferrite single crystal can further include oxides of Ca, oxides of Ni and oxides of Cu.

Figure 1C:
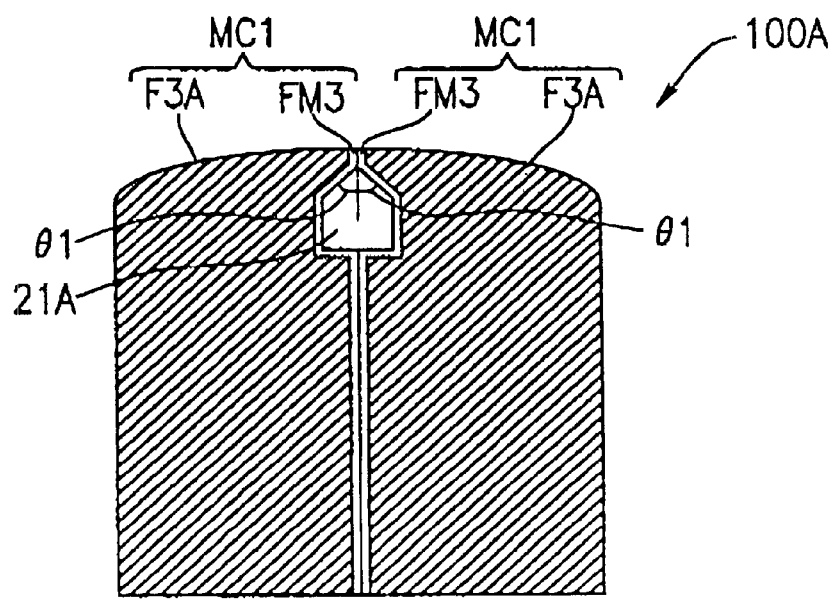
FIG. 1C shows another exemplary magnetic head in the first example according to the present invention.
Figure 1D:
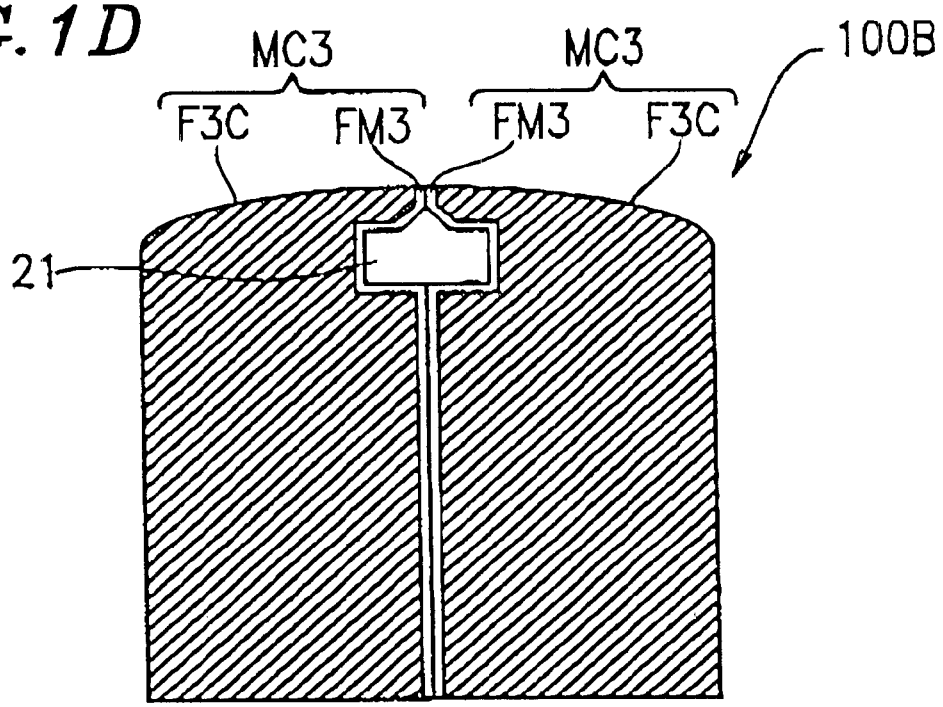
FIG. 1D shows still another exemplary magnetic head in the first example according to the present invention.

FIG. 1C shows another exemplary magnetic head 100A in the first example according to the present invention, and FIG. 1D shows still another exemplary magnetic head 100B in the first example according to the present invention. The magnetic head 100A shown in FIG. 1C includes a winding window 21A in both of the magnetic core halves MC1. The magnetic head 100B shown in FIG. 1D includes a winding window 21, having a different shape from that of the winding window 21A, in both of the magnetic core halves MC3.

In FIGS. 1B, 1C and 1D, the underlying layer UL1 is omitted for simplicity.

Figure 2A:
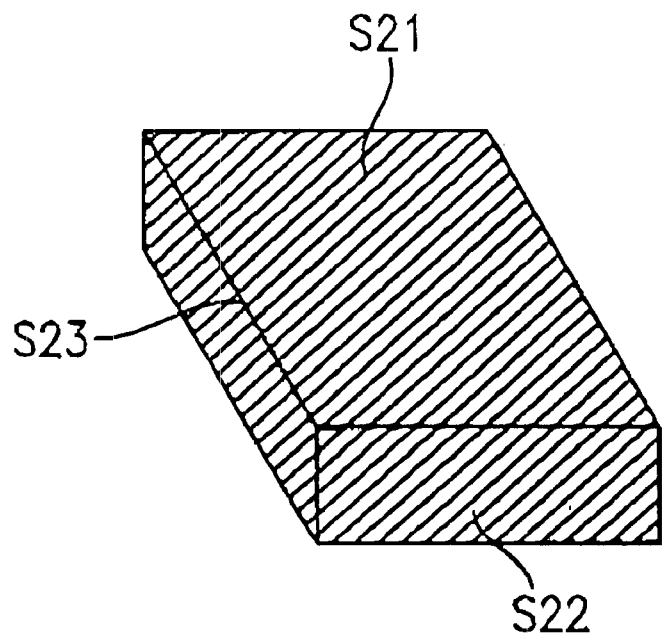
FIGS. 2A through 2D are isometric views illustrating a method for producing the magnetic head in the first example according to the present invention.
Figure 2B:
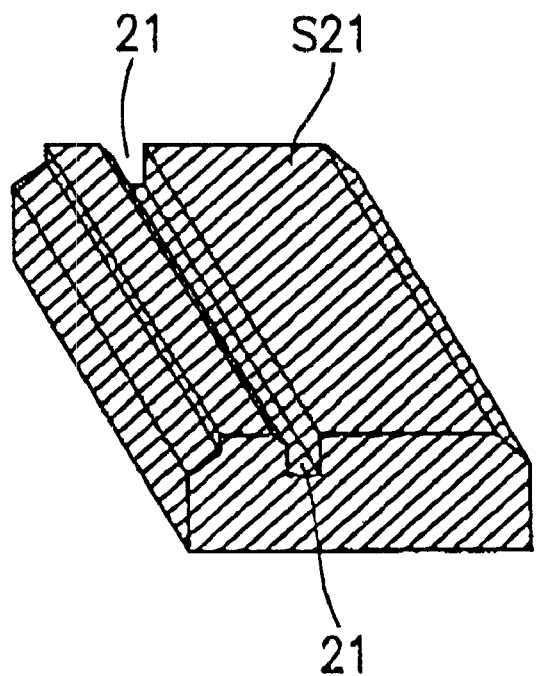
Figure 2C:
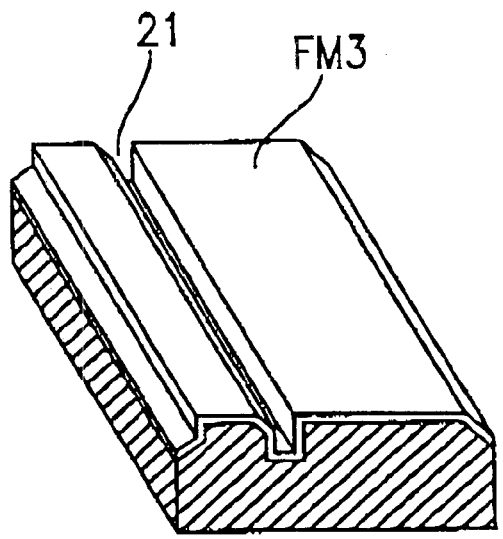
Figure 2D:
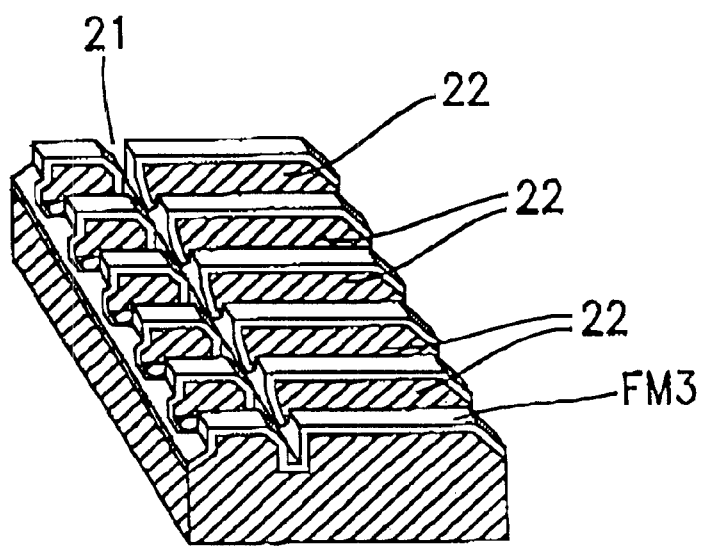
Figure 3A:
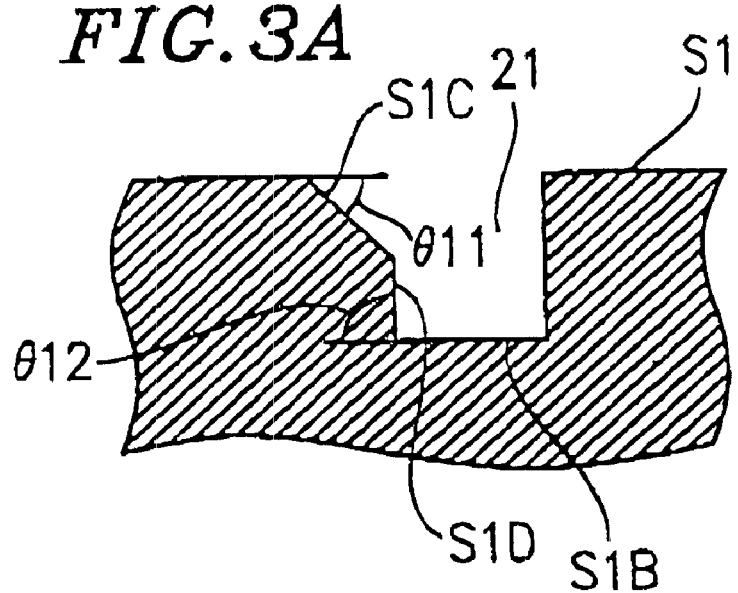
FIG. 3A is an enlarged partial cross-sectional view of a ferrite single crystal having a winding window shown in FIG. 2B.
Figure 3B:
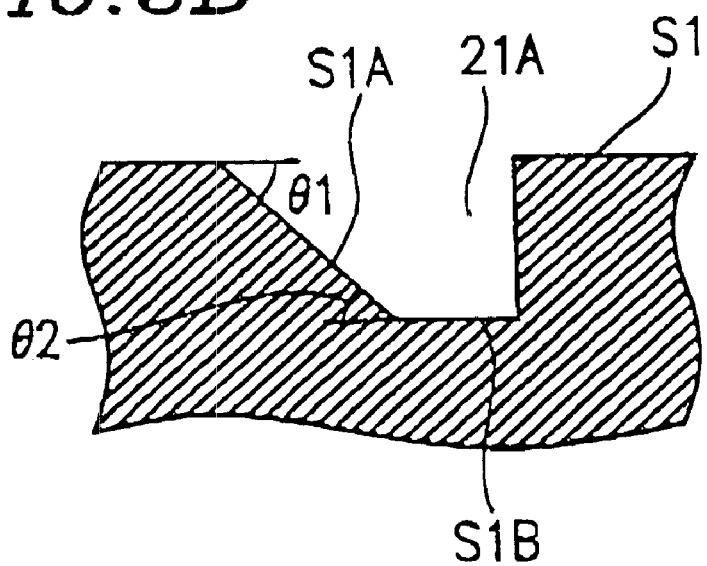
FIG. 3B is a cross-sectional view of a ferrite single crystal having a winding window shown in FIG. 1B.
Figure 3C:
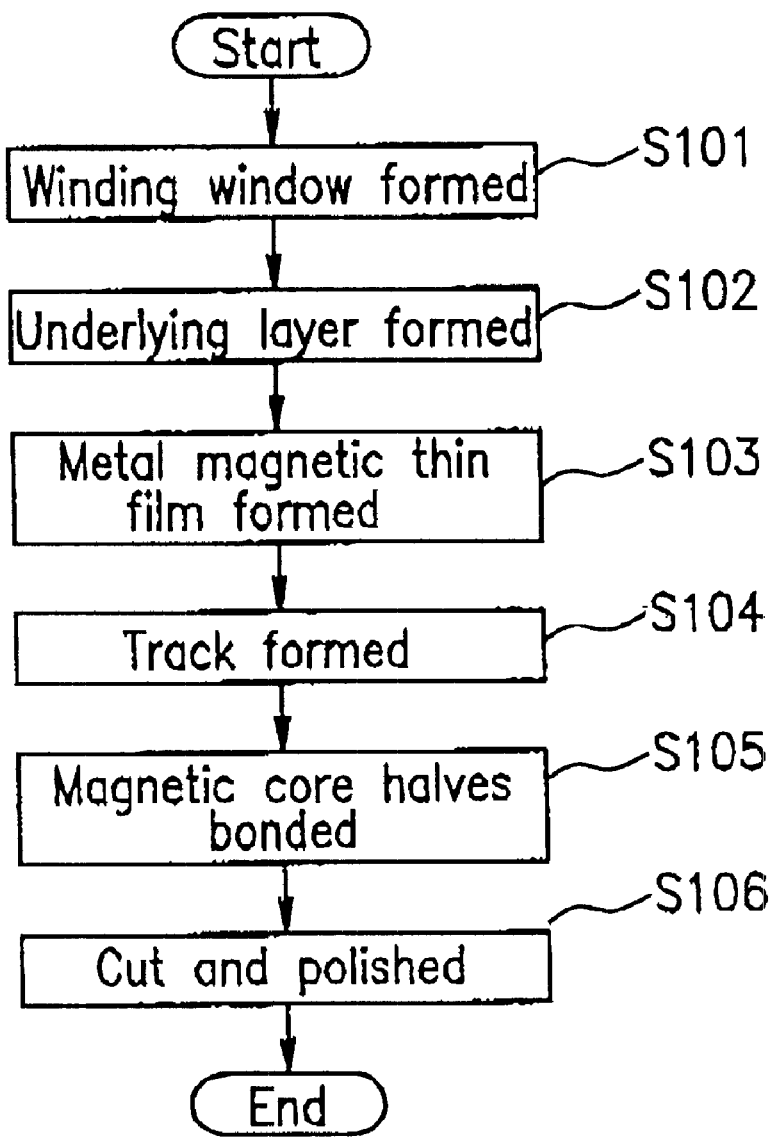
FIG. 3C is a flowchart illustrating a method for producing the magnetic head in the first example according to the present invention.

Hereinafter, a method for producing the magnetic head 100B will be described as an example of a method for producing the magnetic heads 100, 100A and 100B, with reference to FIGS. 2A through 2D showing schematic isometric views and FIG. 3C illustrating a flowchart of the method.

FIG. 2A shows a plate-like rectangular parallelepiped MnZn ferrite single crystal having the surfaces S21, S22 and S23. The surfaces S21, S22 and S23 each have a crystalline orientation of substantially (100). In step S101 (FIG. 3C), the MnZn ferrite single crystal shown in FIG. 2A is processed so as to have a shape shown in FIG. 2B having the winding window 21. More specifically, the surface S21 is out and polished and then a layer, the properties of which have been changed by the cutting and polishing, is removed. When producing the magnetic core half MC2 (FIG. 1B), no winding window is produced. When producing the magnetic core half MC1, the winding window 21A is produced.

Due to the general characteristics of a magnetic head, the surface S21 is preferably a (100) plane, and surfaces S22 and S23 are preferably (100) or (110) planes. Considering the friction of the magnetic head with the magnetic tape which occurs in operation, it is more preferable for the surface S23 to be a (100) plane than a (110) plane. When the surfaces S21 and S23 are both (100) planes, the surface S22 is inevitably a (100) plane.

On a practical level, it is difficult to form the surfaces S21, S22 and S23 to be precisely (100) or (110) planes, but a substantially equivalent effect is obtained when the error of the crystal orientation of the surfaces S21, S22 and S23 is ±4°.

FIG. 3A is an enlarged partial cross-sectional view of the ferrite single crystal having the winding window 21 shown in FIG. 2B. FIG. 3B is a cross-sectional view of a ferrite single crystal having the winding window 21A (FIG. 1B). The cross-sectional shape of the winding window 21 shown in FIG. 3A is inclined only in the vicinity of the combining surface S1 (S21 in FIG. 2B). Due to such an inclination, the magnetic flux is narrowed and thus the characteristics of a magnetic head are improved.

The winding window 21A shown in FIG. 3B has a first inner side surface S1A and a bottom surface S1B. The first inner side surface S1A is extended form the bottom surface S1B toward the combining surface S1 and is provided on the side of the recording medium running surface with respect to the bottom surface. Angle θ1 made by the combining surface S1 and the first inner side surface is equal to angle θ2 made by the bottom surface S1B and the first inner side surface S1A; i.e., θ1=θ2. In the magnetic head 100 (FIG. 1B) having the winding window 21A in only one of the two magnetic core halves (i.e., the magnetic core half MC1), a favorable result of narrowing the magnetic flux is obtained when θ1=about 45° to about 70°. In the magnetic head 100A (FIG. 1C) having the winding window 21A in both of the two magnetic core halves MC1, a favorable result of narrowing the magnetic flux is obtained when θ1=about 22.5° to about 50°.

The size of the winding window 21A is determined so that a required number of turns can be provided. Where two winding windows allowing an identical number of turns are compared, the winding window having a shorter magnetic path when seen from the tape running surface provides a higher level of reproduction sensitivity of the magnetic head.

In order to shorten the magnetic path while keeping the effect of narrowing the magnetic flux, the winding window 21 shown in FIG. 3A is preferable. The winding window 21 includes the bottom surface S1B and, the side corresponding to the first inner side surface S1A in FIG. 3B is divided into a second inner side surface S1C and a third inner side surface S1D. Angle θ11 made by the combining surface S1 and the second inner side surface S1B is different from θ12 made by the third inner side surface S1D ad the bottom surface S1B.

Angle θ11, which relates to narrowing of the magnetic flux, provides a favorable result in the same range as described above. In other words, in the magnetic head having the winding window 21 in only one of the two magnetic core halves (not shown), a favorable result of narrowing the magnetic flux is obtained when θ11=about 45° to about 70°. In the magnetic head 100B (FIG. 1D) having the winding window 21 in both of the two magnetic core halves MC3, a favorable result of narrowing the magnetic flux is obtained when θ11=about 22.5° to about 50°.

Angle θ12 is preferably substantially 90° as shown in FIG. 3A in order to keep the size of the winding window 21 required for a desired number of turns of winding while shortening the magnetic path.

After the winding window (e.g., 21) is formed, the underlying layer UL1 (FIG. 1A) of alumina is formed on the combining surface S1 in step S102 (FIG. 3C). The underlying layer UL1 is formed since formation of the metal magnetic thin film FM3 directly on the ferrite (i.e., oxide) sections F3A and F3B undesirably causes oxygen to diffuse during heat treatment. Other materials favorably usable for the underlying layer UL1 include oxides of silicon, oxides of aluminum, nitrides of aluminum, nitrides of silicon, and mixtures thereof. The underlying layer UL1 preferably has a thickness of about 0.5 nm or more to prevent the diffusion of oxygen. The effect of preventing the diffusion of oxygen is better as the underlying layer UL1 is thicker, but the magnetic flux leaks when the underlying layer UL1 is too thick since the materials favorable for the underlying layer UL1 are nonmagnetic. The leaking of the magnetic flux deteriorates the characteristics of the magnetic head. Accordingly, the thickness of the underlying layer UL1 is preferably about 4 nm or less.

In step S103 (FIG. 3C), the metal magnetic thin film FM3 is formed on the underlying layer UL1. A more favorable effect is provided by forming a second underlying layer UL2 (FIG. 1E) having a thickness of about 0.5 nm or more to about 200 nm or less, preferably about 0.5 nm to about 20 nm, before the metal magnetic thin film FM3 is formed. The amount of each of oxygen and nitrogen contained in the second underlying layer UL2 is larger than that contained in the metal magnetic thin film FM3. The metal magnetic thin film FM3 is formed using a solid material. FIG. 2C shows the resultant body. In FIG. 2C and FIG. 2D (described below), the underlying layers UL1 and UL2 are omitted for simplicity.

After a nonmagnetic gap layer (not shown) is formed on the metal magnetic thin film FM3, a groove or grooves 22 (i.e., track or tracks) are formed for regulating the width of a track in step S104 (FIG. 3C). FIG. 2D shows the resultant body. Then, the nonmagnetic layer N3 is formed on the body shown in FIG. 2D.

In step S105 (FIG. 3C), the resultant body with the nonmagnetic layer N3 is properly positioned to face another identical body, and a bonding glass material is caused to flow by the heat treatment performed in an inactive gas atmosphere to bond the two bodies. In step S106 (FIG. 3C), the resultant assembly is cut into a desired shape and polished. Thus, the magnetic head 100B (FIG. 1D) including the two magnetic core halves MC3 is obtained. The magnetic heads 100 (FIG. 1B) and 100A (FIG. 1C) are obtained in a similar manner with appropriate changes.

For forming the magnetic head according to the present invention, usual methods are usable. For example, cutting can be performed using a dicing saw including a resin bond diamond blade or a metal resin bond diamond blade, a slicing saw or the like. Polishing can be performed by, for example, rotation lapping using green carbon (SiC) grindstone or diamond grindstone in combination with a cast iron or tin surface plate, or using a lapping tape including an organic resin tape and alumina or diamond grindstone dispersed thereon.

When necessary, a layer of the ferrite, the properties of which have been changed, can be removed by, for example, acid surface etching using phosphoric acid or the like, or mechanochemical lapping using a low weight tin surface plate in combination with colloidal silica grindstone adjusted to be weakly acidic.

The underlying layers UL1 and UL2 and the nonmagnetic layer for combining the magnetic core halves according to the present invention can be formed by usual gas phase film formation methods, for example, by sputtering such as high frequency magnetron sputtering, counter target sputtering, ion beam sputtering, ECR sputtering or the like, or by CVD.

The metal magnetic thin film can be formed in a low gas pressure atmosphere by sputtering, for example, high frequency magnetron sputtering, DC sputtering, counter target sputtering, ion beam sputtering, ECR sputtering, or the like.

The metal magnetic thin film is specifically produced as follows. An alloy target, having a composition determined in consideration of a possible offset in the composition from the composition intended according to the present invention, is formed on a base by sputtering using an inactive gas such as argon or the like. A portion of an additive can be provided on the alloy target as a pallet and sputtered together with the alloy target. Alternatively, a portion of the additive can be introduced into the sputtering apparatus in a gaseous state and reactive sputtering can be performed.

The pair of magnetic core halves can be bonded together by glass bonding using a bonding glass material, which is usually used for ferrite heads and MIG heads. For example, a bonding glass material selected from bonding glass materials having a softening point of about 460° C. to about 560° C. is heat-treated at a temperature selected from the range of softening point ±40° C. and caused to flow in at least two portions around the magnetic core halves to be bonded. The bonding glass material is then cured. Thus, the magnetic core halves are combined together.

As described above, in the first example according to the present invention, the metal magnetic thin film FM3 is provided only on the combining surface S1 of each of the magnetic core halves and not on the outer side surface S1 or S3. Consequently, the ferrite sections F3A and F3B are prevented from cracking by the undesirable internal stress in the metal magnetic thin film FM3.

Therefore, according to the present invention, a magnetic head which is satisfactory in the anti-corrosion characteristic and input and output characteristic and is durable against cracks and a method for producing such a magnetic head are provided.

EXAMPLE 2

Figure 4A:
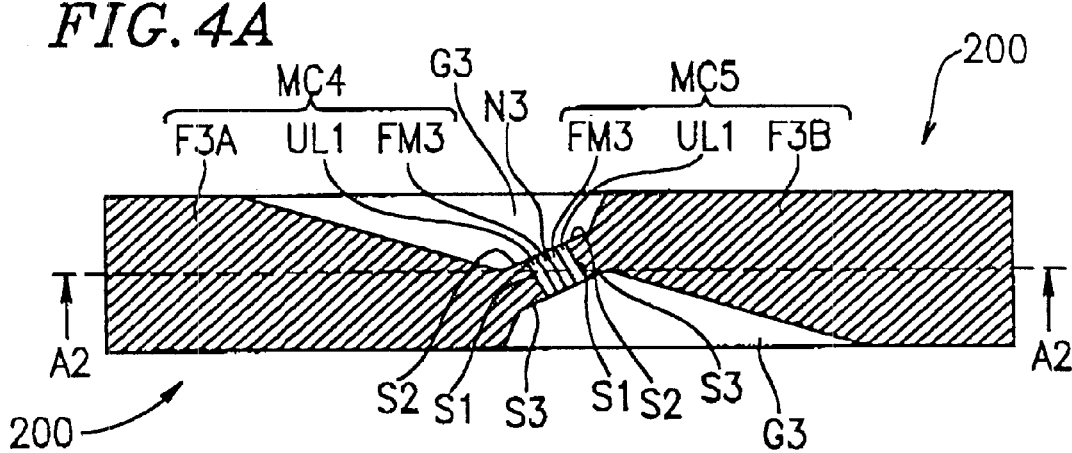
FIG. 4A is a new of a surface of a magnetic head in a second example according to the present invention, on which a recording tape runs.
Figure 4B:
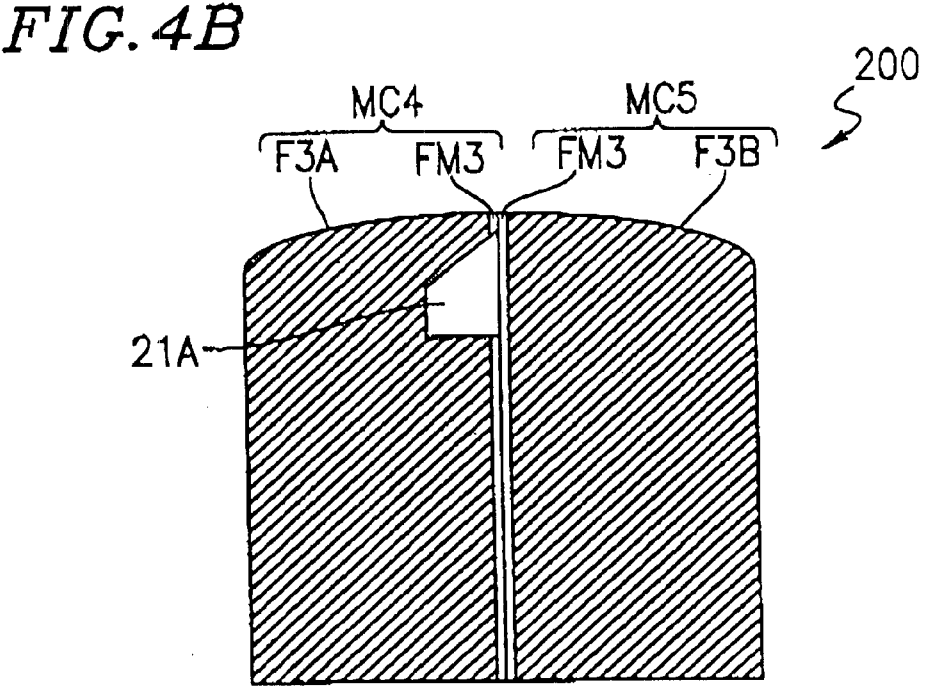
FIG. 4B is a cross-sectional view taken along line A2—A2 in FIG. 4A.

FIGS. 4A and 4B schematically show a magnetic head 200 in a second example according to the present invention. FIG. 4A is a view of a tape running surface of the magnetic head 200. FIG. 4B is a cross-sectional view taken along line A2—A2 in FIG. 4A. The magnetic head 200 includes two magnetic core halves MC4 and MC5, and includes a winding window 21A in one of the magnetic core halves (i.e., the magnetic core half MC4).

Figure 4C:
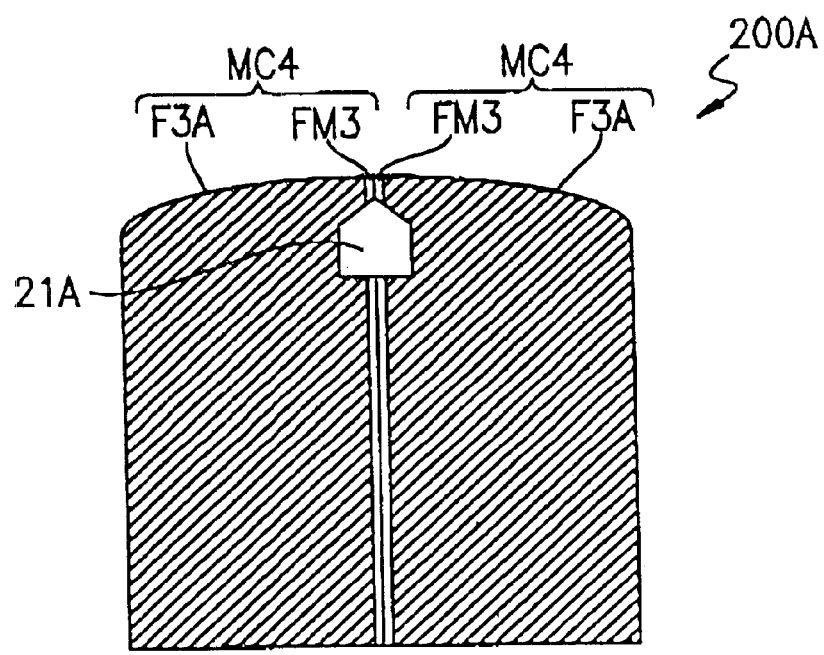
FIG. 4C shows another exemplary magnetic head in the second example according to the present invention.
Figure 4D:
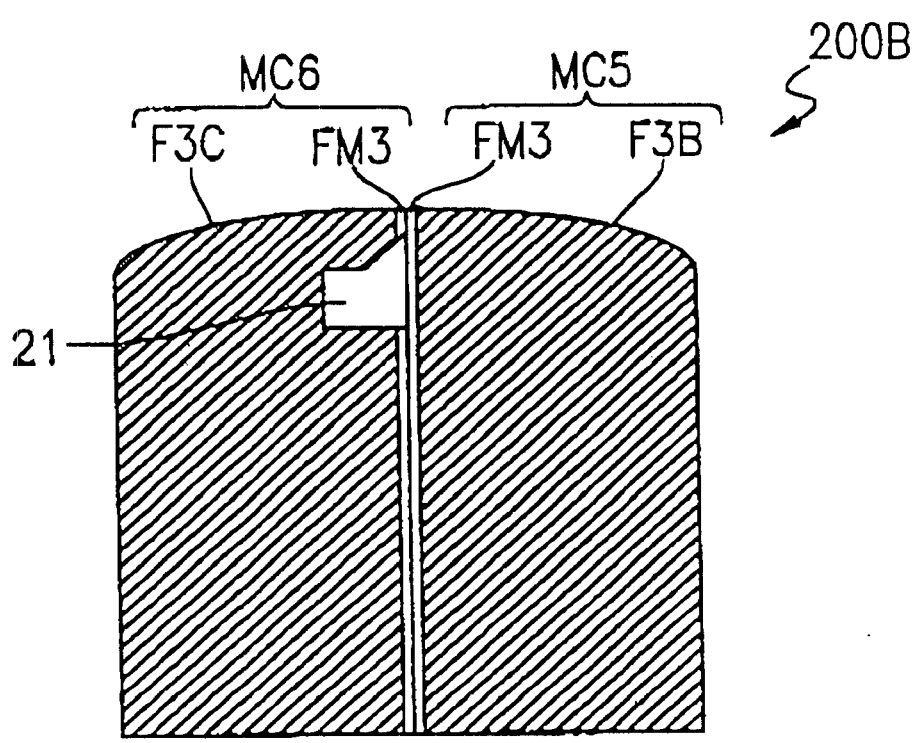
FIG. 4D shows still another exemplary magnetic head in the second example according to the present invention.

FIG. 4C shows another exemplary magnetic head 200A in the second example according to the present invention, and FIG. 4D shows still another exemplary magnetic head 200B in the second example according to the present invention. The magnetic head 200A shown in FIG. 4C includes a winding window 21A in both of the magnetic core halves MC4. The magnetic head 200B shown in FIG. 4D includes two magnetic core halves MC5 and MC6, and includes a winding window 21, having a different shape from the winding window 21A, in one of the magnetic core halves (i.e., the magnetic core half MC6).

In FIGS. 4B, 4C and 4D, the underlying layer UL1 is omitted for simplicity.

Figure 5A:
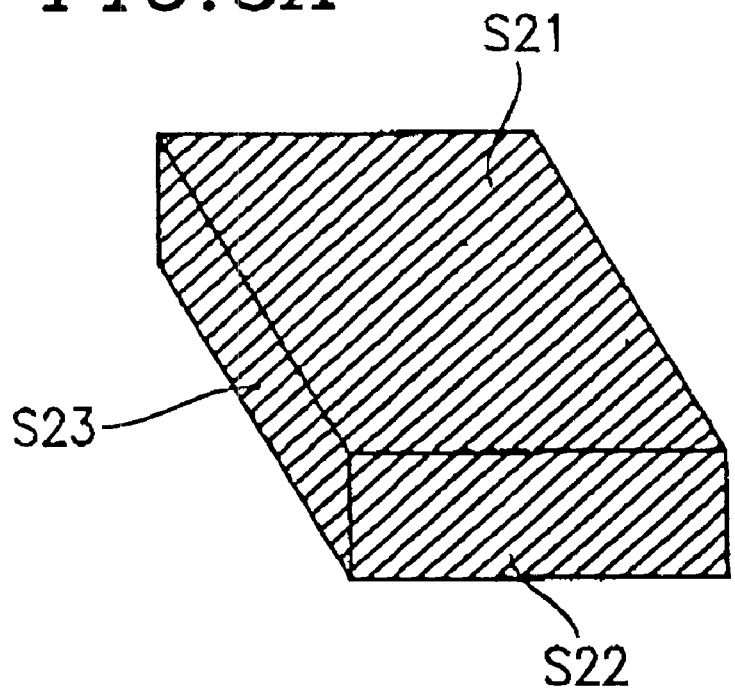
FIGS. 5A through 5D are isometric views illustrating a method for producing the magnetic head in the second example according to the present invention.
Figure 5B:
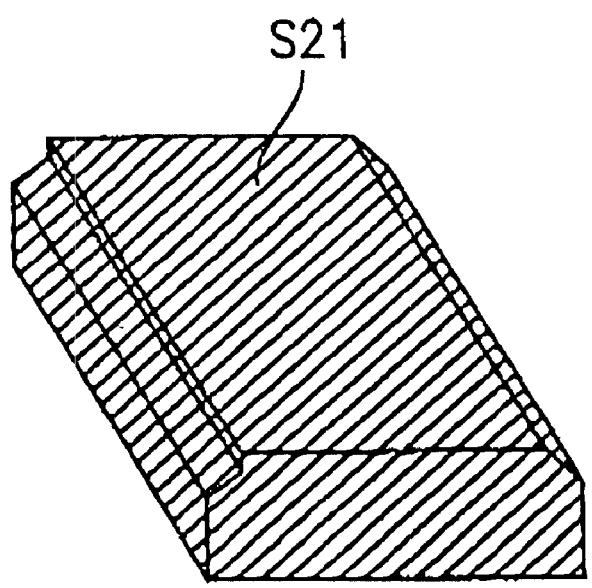
Figure 5C:
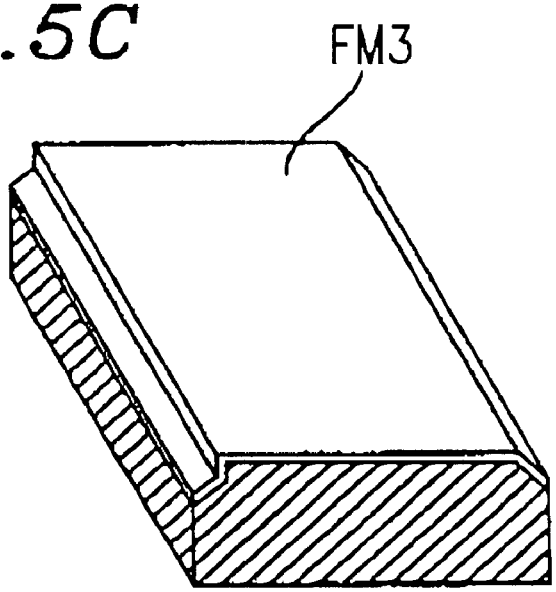

Hereinafter, a method for producing the magnetic head 200B will be described as an example of a method for producing the magnetic heads 200, 200A and 200B, with reference to FIGS. 5A through 5D showing schematic isometric views and FIG. 5C illustrating a flowchart of the method.

FIG. 5A shows a rectangular parallelepiped MnZn ferrite single crystal having the surfaces S21, S22 and S23. The MnZn ferrite single crystal shown in FIG. 5A is cut and polished so as to have a shape shown in FIG. 5B. The surface S21 is polished and then the layer, the properties of which have been changed by the cutting and polishing, is removed. In step S201 (FIG. 5E), an underlying layer UL1 (FIG. 4A) of alumina is formed on the combining surface S1. Other materials usable for the underlying layer include oxides of silicon, oxides of aluminum, and nitrides of aluminum, nitrides of silicon, and mixtures thereof as in the first example.

In step S202 (FIG. 5E), the metal magnetic thin film FM3 is formed on the underlying layer UL1. A more favorable effect is provided by forming a second underlying layer UL2 (FIG. 4E) having a thickness of about 0.5 nm or more to about 200 nm or less, preferably about 0.5 nm to about 20 nm, and an average particle diameter of about 5 nm or less in the vicinity of the interface with the underlying layer UL1 is formed before the metal magnetic thin film FM3 is formed. The amount of each of oxygen and nitrogen contained in the second underlying layer UL2 is larger than that contained in the metal magnetic thin film FM3. FIG. 5C shows the resultant body. In FIG. 5C and FIG. 5D (described below), the underlying layers UL1 and UL2 are omitted for simplicity.

Figure 5D:
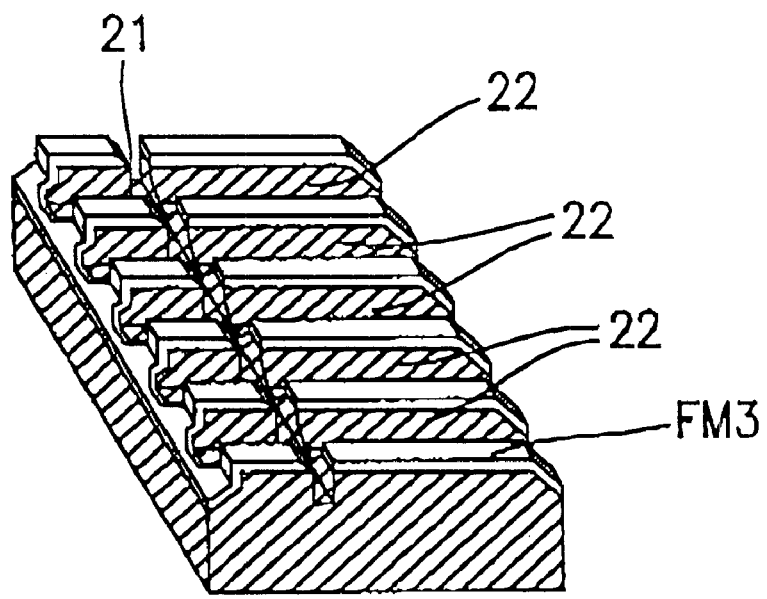
Figure 5E:
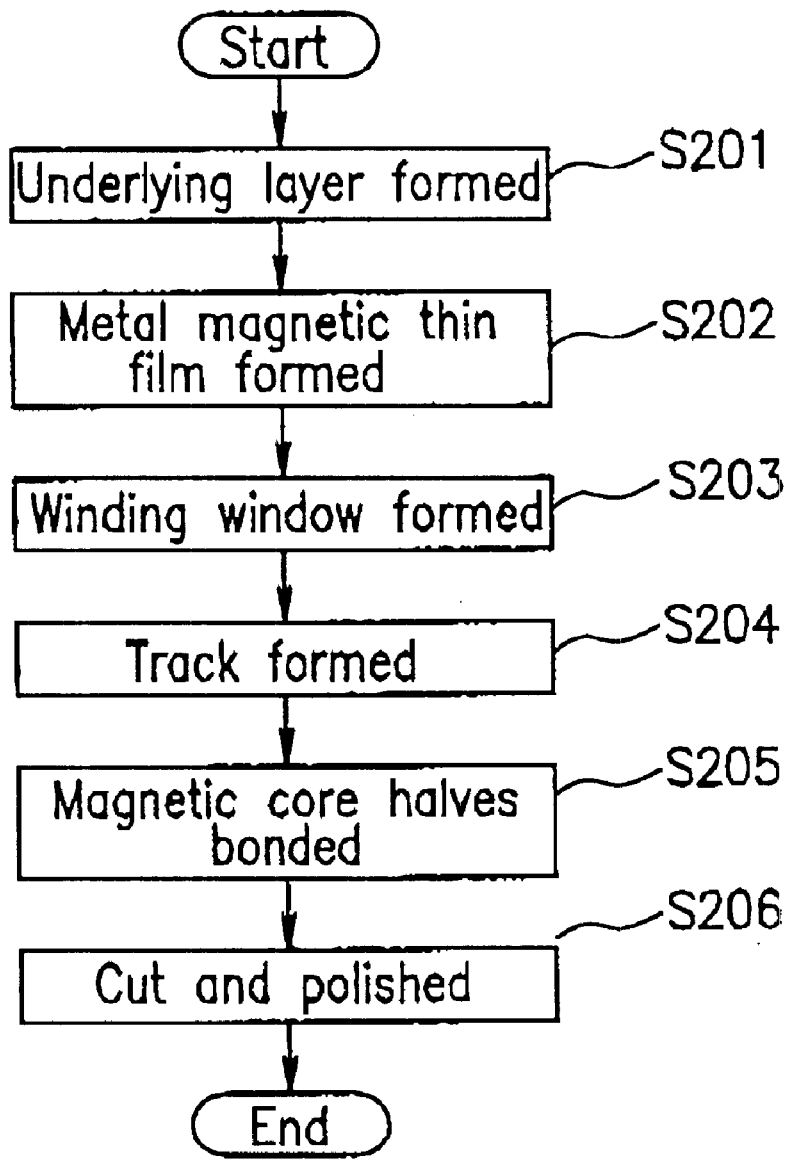
FIG. 5E is a flowchart illustrating a method for producing the magnetic head in the first example according to the present invention.

After a nonmagnetic gap layer (not shown) is formed on the metal magnetic thin film FM3, the winding window 21 is formed in step S203 (FIG. 5E). When producing the magnetic core half MC5 (FIG. 4B), no winding window is produced. When producing the magnetic core half MC4 (FIG. 4B), the winding window 21A of a different shape is produced. The winding window 21 can have the same shape as that in the first example.

In step S204 (FIG. 5E), a groove or grooves 22 (i.e., track or tracks) are formed for regulating the width of a track. FIG. 5D shows the resultant body. Then, the nonmagnetic layer N3 is formed on the body shown in FIG. 5D. In step S205 (FIG. 5E), the resultant body with the nonmagnetic layer N3 is properly positioned to face another body without any winding window, and a bonding glass material is caused to flow by the heat treatment performed in an inactive gas atmosphere to bond the bodies. In step S206 (FIG. 5E), the resultant assembly is cut into a desired shape and polished. Thus, the magnetic head 200B (FIG. 4D) including the magnetic core halves MC6 and MC5 is obtained. The magnetic head 200 (FIG. 4B) and 200A (FIG. 4C) are obtained in a similar manner with appropriate changes.

As described above, in the second example according to the present invention, the metal magnetic thin film FM3 is provided only on the combining surface S1 of each of the magnetic core halves and not on the outer side surface S2 or S3. Consequently, the ferrite sections F3A and F3B are prevented from cracking by the undesirable internal stress in the metal magnetic thin film FM3.

Therefore, according to the present invention, a magnetic head which is satisfactory in the anti-corrosion characteristic and input and output characteristic and is durable against cracks and a method for producing such a magnetic head are provided.

EXAMPLE 3

FIG. 6 is a block diagram of a video recording and reproduction apparatus 800 including a plurality of magnetic heads 100 in the first example according to the present invention.

The video recording and reproduction apparatus 800 includes the magnetic heads 100, a cylinder 801 for securing the magnetic heads 100, a head/tape interface mechanism 805 for winding a magnetic tape 804 around the cylinder 801, a cylinder driving section 802 for rotating the cylinder 801, and a magnetic tape driving section 803 for driving the magnetic tape 804 would around the cylinder 801.

The video recording and reproduction apparatus 800 performs recording or reproduction of a video signal or an audio signal as follows.

The cylinder driving section 802 rotates the cylinder 801 at a constant rate. The magnetic tape driving section 803 feeds the magnetic tape 804 from one reel at a constant rate so that the magnetic tape 804 runs along the cylinder 801 and then is wound around another reel. The head/tape interface mechanism 805 acts to wind the magnetic tape 804 around the cylinder 801 obliquely.

When the cylinder 801 starts rotating, the magnetic heads 100 scan the magnetic tape 804 at a constant cycle. During a recording operation, the magnetic heads 100 convert an input electric signal into a magnetic flux to change the magnetization state of a magnetic material on the magnetic tape 804. Thus, recording is performed. During a reproduction operation, the magnetic heads 100 convert a magnetic flux on the magnetic tape 804 into an electric signal.

According to the present invention, a video recording and reproduction apparatus including a magnetic head which is satisfactory in the anti-corrosion characteristic and input and output characteristic and is durable against cracks is provided.

EXAMPLE 4

Figure 7:
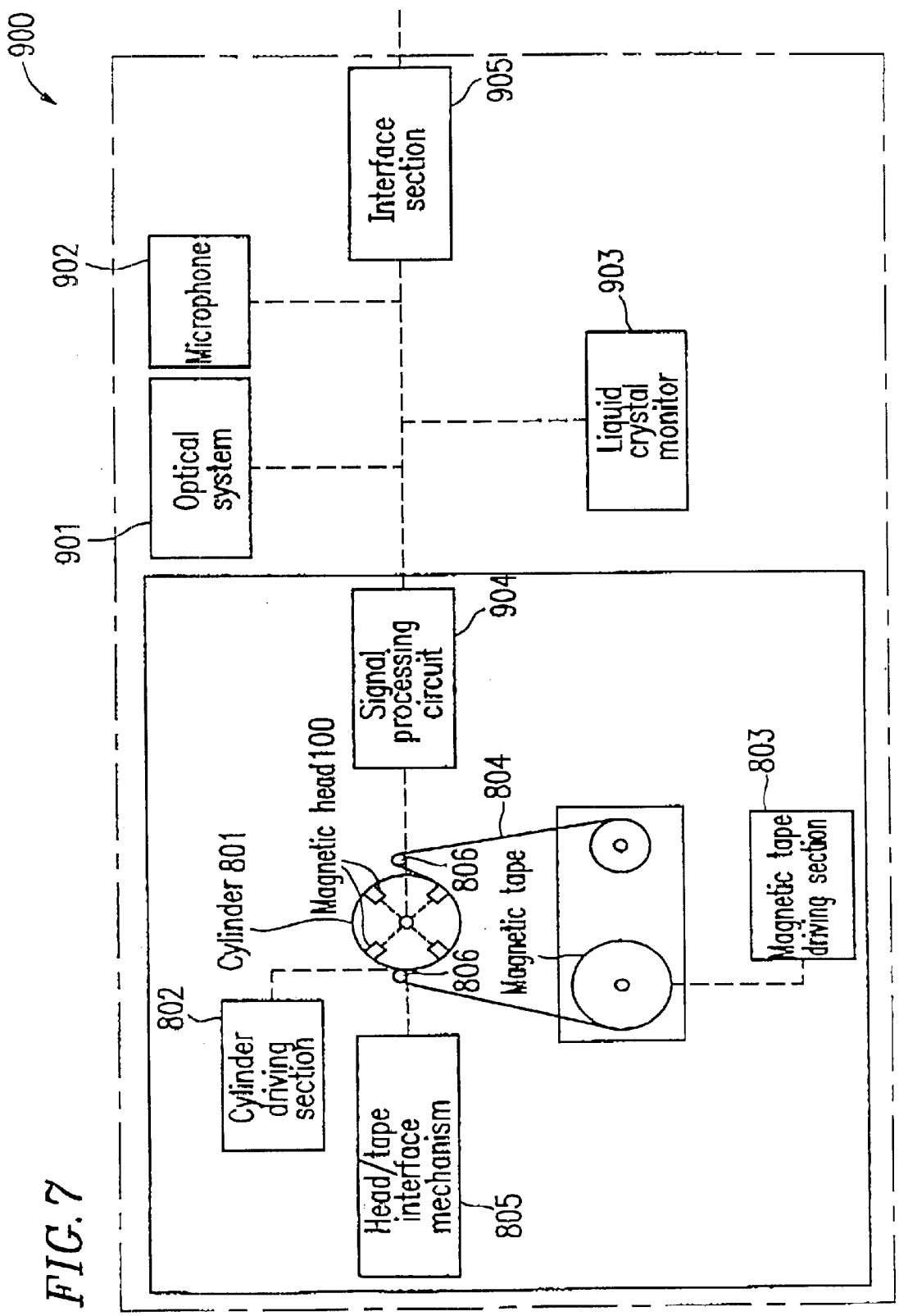
FIG. 7 is a block diagram showing a structure of a video camera in a fourth example according to the present invention.
Figure 8:
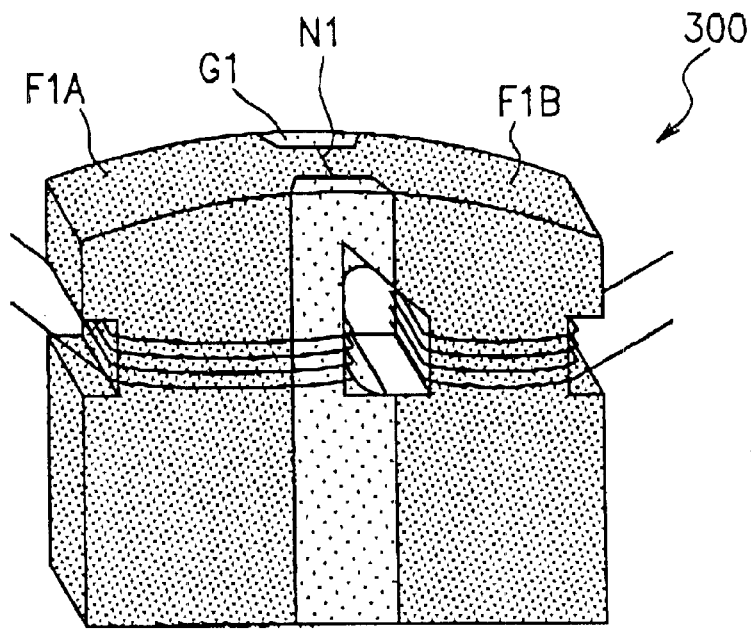
FIG. 8 is a schematic isometric view showing an exemplary conventional ferrite head.
Figure 9A:
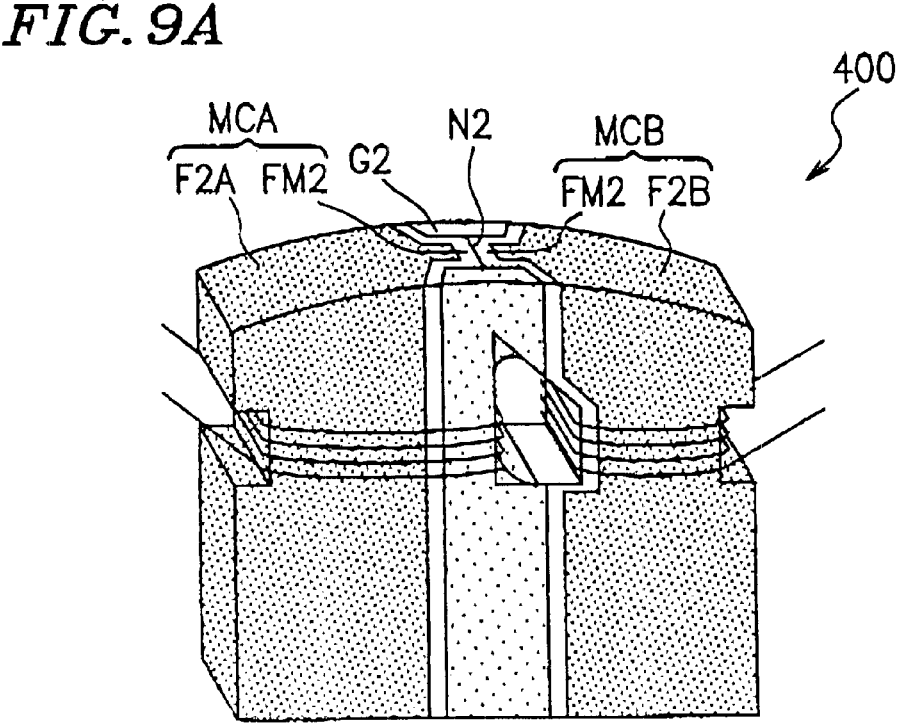
FIGS. 9A through 9D are schematic views of an exemplary conventional MIG head.
Figure 9B:
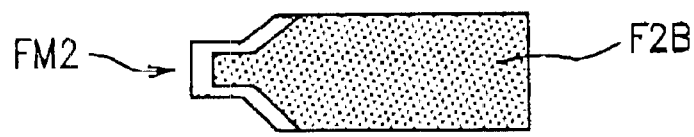
Figure 9C:
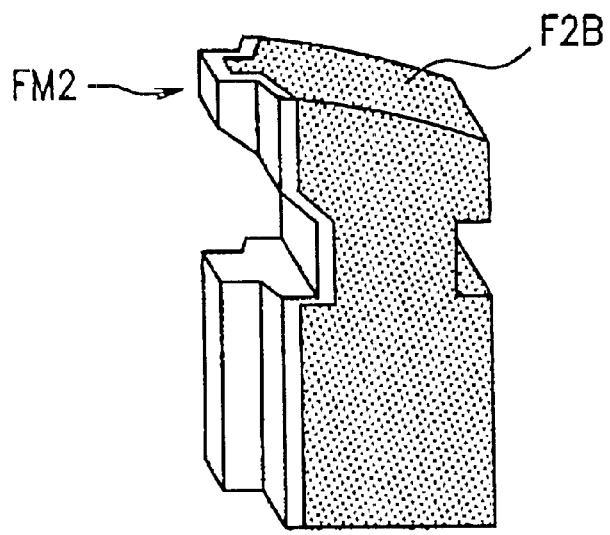
Figure 9D:
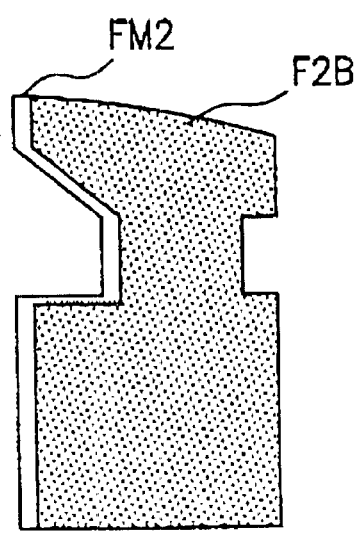

FIG. 7 is a block diagram of a video camera 900 including a plurality of magnetic heads 100 in the first example according to the present invention.

The video camera 900 includes the magnetic heads 100, a cylinder 801 for securing the magnetic heads 100, a head/tape interface mechanism 805 for winding a magnetic tape 804 around the cylinder 801, a cylinder driving section 802 for rotating the cylinder 801, a magnetic tape driving section 803 for driving the magnetic tape 804 wound around the cylinder 801, an optical system 901 for converting a video signal into an electric signal, a microphone 902 for converting an audio signal into an electric signal, a signal processing circuit 904 for outputting the electric signals from the optical system 901 and the microphone 902 to the magnetic heads 100, and a liquid crystal monitor 903 for displaying a video signal.

The video camera 900 performs recording or reproduction of a video signal or an audio signal in a similar manner to that in the third example.

During a recording operation, the video signal and the audio signal are recorded on the magnetic tape 804 by the magnetic heads 100 and also displayed on the liquid crystal monitor 903. During a reproduction operation, the video signal reproduced by the magnetic heads 100 are displayed on the liquid crystal monitor 903 through the signal processing circuit 904 and output to an external device (not shown) through an interface section 905. The audio signal reproduced by the magnetic heads 100 is output through a speaker (not shown).

According to the present invention, a video camera including a magnetic head which is satisfactory in the anti-corrosion characteristic and input and output characteristic and is durable against cracks is provided.

SPECIFIC EXAMPLES

Specific examples of the present invention will be described in detail.

SPECIFIC EXAMPLE 1

The magnetic heads described in the first example having no metal magnetic thin film on the outer side surfaces, and the conventional magnetic heads 400 shown in FIGS. 9A through 9D having the metal magnetic thin film FM2 on the outer side surfaces as a comparative example, were produced with the common specifications described below under the conditions shown in Table 1. The magnetic heads were evaluated for the recording and reproduction output, anti-corrosion characteristic, and ferrite cracking ratio.

TABLE 1

| | Condition | | | | Evaluation | | |
|---|---|---|---|---|---|---|---|
| NO. | Metal magnetic thin film | Metal magnetic thin film on side surfaces? | Shape of winding window θ1 | θ2 | Recording/ reproduction output | Anti-corrosion characteristic (deterioration in output after spraying with salt water) | Cracking ratio (%) |
| 1 ✗ | ba | Yes | 45 | 45 | 56 dB | −6 dB | 20 |
| 2 ✗ | ac | Yes | 45 | 45 | Δ | ○ | 35 |
| 3 ✗ | ae | Yes | 45 | 45 | ○ | ○ | 25 |
| 4 ✗ | ag | Yes | 45 | 45 | ○ | ○ | 30 |
| 5 ✗ | bb | No | 45 | 45 | Δ | Δ | 0 |
| 6 ✗ | bc | No | 45 | 45 | × | × | 0 |
| 7 ✗ | bd | No | 45 | 45 | Δ | Δ | 0 |
| 8 ✗ | be | No | 45 | 45 | × | × | 0 |
| 9 ✗ | bf | No | 45 | 45 | × | ○ | 0 |
| 10 ✗ | bg | No | 45 | 45 | × | ○ | 0 |
| 11 | aa | No | 45 | 45 | ○ | ○ | 0 |
| 12 | ab | No | 45 | 45 | ○ | ○ | 0 |
| 13 | ac | No | 45 | 45 | ○ | ○ | 0 |
| 14 | ad | No | 45 | 45 | ○ | ⊙ | 0 |
| 15 | ae | No | 45 | 45 | ○ | ⊙ | 0 |
| 16 | af | No | 45 | 45 | ○ | ⊙ | 0 |
| 17 | ag | No | 45 | 45 | ○ | ⊙ | 0 |
| 18 | ac | No | 60 | 60 | ○ | ⊙ | 0 |
| 19 | ad | No | 60 | 60 | ○ | ⊙ | 0 |
| 20 | ac | No | 45 | 90 | ⊙ | ⊙ | 0 |
| 21 | ad | No | 60 | 90 | ⊙ | ⊙ | 0 |

✗: comparative examples
⊙ : Significantly superior to No. 1
○ : Superior to No. 1
Δ: Equivalent to No. 1
×: Inferior to No. 1

In Table 1, compositions of the metal magnetic thin films are indicated with aa through ag and ba through bg, which are shown in Table 2. In order to evaluate the anti-corrosion characteristic, salt water was sprayed on the samples. The recording and reproduction outputs before and after this test were compared. The anti-corrosion characteristic was evaluated by the degree of deterioration in the outputs. The ferrite cracking ratio was evaluated by the ratio of samples determined to be defective due to the ferrite cracking with respect to the total number of samples in each category.

In Table 1, the evaluation of the recording and reproduction output and the anti-corrosion characteristic and is shown with respect to the conventional magnetic head indicated by No. 1. "X" indicates inferiority as compared to the No. 1 magnetic head, "Δ" indicates equivalence to the No. 1 magnetic head, "○" indicates superiority over the No. 1 magnetic head (i.e., superiority of more than 0 and less than +2 dB), and "⊙" indicates significant superiority over the No. 1 magnetic head (i.e., superiority of +2 dB or more).

The evaluation of the cracking ratio is shown with a percentage.

Each metal magnetic thin film contains magnetic crystalline particles. The magnetic crystalline particles can each have a generally needle-like shape, a generally column-like shape, or a multiple-branch shape (i.e., combination of the generally needle-like shape and the generally column-like shape).

TABLE 2

| | Composition of metal magnetic thin film wt % | dS nm | dL nm |
|---|---|---|---|
| Examples | | | |
| aa | $(Fe_{98}Si_{0.5}Ta_{1.5})_{93}O_2N_5$ | 19 | 320 |
| ab | $(Fe_{98}Si_{1.5}Ta_{0.5})_{93}O_2N_5$ | 21 | 330 |
| ac | $(Fe_{86}Si_{10}Al_2Ta_2)_{93}O_2N_5$ | 18 | 280 |
| ad | $(Fe_{87.5}Si_9Al_{1.5}Ta_2)_{93}N_7$ | 22 | 340 |
| ae | $(Fe_{85}Si_{10.5}Al_{2.5}Ta_2)_{91}N_9$ | 15 | 150 |
| af | $(Fe_{76.5}Si_{16}Al_7Ta_{0.5})_{92}N_8$ | 16 | 160 |
| ag | $(Fe_{83}Si_{10}Al_2Ta_5)_{90}N_{10}$ | 15 | 250 |
| Comparative Examples | | | |
| ba | $Fe_{73}Si_{18}Al_9$ | 200 | 500 |
| bb | $(Fe_{98}Ta_2)_{93}O_2N_5$ | 22 | 340 |
| bc | $(Fe_{98}Si_{0.5}Ta_{1.5})_{93}O_2N_5$ | 200 | 480 |
| bd | $(Fe_{98}Si_2)_{93}O_2N_5$ | 24 | 340 |
| be | $(Fe_{98}Si_{1.5}Ta_{0.5})_{93}O_2N_5$ | 160 | 420 |
| bf | $(Fe_{70}Si_{20}Al_7Ta_3)_{93}O_2N_5$ | 10 | 150 |
| bg | $(Fe_{86}Si_{10}Al_2Ta_2)_{88}O_4N_8$ | 5 | 30 |

In Table 2, "dS" indicates the average length of a shorter side of the magnetic crystalline particles, and "dL" indicates the average length of a longer side of the magnetic crystalline particles. As shown in Table 2, dL exceeds 50 nm, and preferably is more than 60 nm and less than 5000 nm. dS is more than 5 nm and less than 60 nm.

Compositions aa through ag are represented by $(M_zX_bZ_c)_{100-d}A_d$. M includes at least one magnetic metal element selected from the group consisting of Fe, Co and Ni. X includes at least one element selected from the group consisting of Si, Al, Ga and Ge. Z includes at least one element selected from the group consisting of elements of group IVa, elements of group Va and Cr. A includes at least one element selected from the group consisting of O and N.

a, b, c and d fulfill the relationship of:

about $0.1 \leq b \leq$ about 26, about $0.1 \leq c \leq$ about 5, a+b+c=100, and about $1 \leq d \leq$ about 10.

Compositions ac through ag are represented by $(Fe_aSi_bAl_cT_d)_{100-e}N_e$. T includes at least one element selected from the group consisting of Ti and Ta.

a, b, c, d and e fulfill the relationship of:

about $10 \leq b \leq$ about 23, about $0.1 \leq c \leq$ about 5, about $0.1 \leq c+d \leq$ about 8, a+b+c+d=100, and about $1 \leq e \leq$ about 10.

The common specifications mentioned above are as follows.

Head:

Track width: 17 μm

Gap depth: 12.5 μm

Gap length: 0.2 μm

Number of turns: 16

Metal magnetic thin film thickness: 4.5 μm

Underlying layer: alumina; thickness: 2 nm

C/N (carrier-to-noise ratio) characteristic:

Relative speed of tape: 10.2 m/s

Recording and reproduction frequency: 20.9 MHz

Tape: MP tape

Even when the structure in the magnetic heads in Table 1 (first example) was changed to the structure in the second example, the test results showed a similar tendency to that of Table 1.

Even when Si in Table 2 was changed to Ge, the test results showed a similar tendency to that of Table 1. Even when Si in compositions aa and ab in Table 2 was changed to Al, the test results showed a similar tendency to that of Table 1.

Even when Ta in Table 2 was changed to Ti, Zr, Hf, V, Nb or Cr, the test results showed a similar tendency to that of Table 1.

The expression "similar tendency" refers to that, for example, although the numerical values of the recording and reproduction output are not exactly the same, but the same evaluation, i.e., "X", "Δ", "○" or "⊙" is obtained.

Based on the above-described experimental results, it was confirmed that the magnetic heads according to the present invention (indicated with No. 11 through No. 21) are improved in the recording and reproduction output, anti-corrosion characteristic and ferrite cracking ratio. The No. 14 through No. 21 magnetic heads were especially favorable in the anti-corrosion characteristic. The No. 20 and No. 21 magnetic heads having a winding window in which θ12=90° (FIG. 3A) were favorable in the recording and reproduction output.

The metal magnetic thin film includes a magnetic film containing, as a major material, magnetic crystalline particles. The magnetic crystalline particles of each composition mentioned above according to the present invention were observed to have a generally needle-like shape, a generally column-like shape, or a multiple-branch shape (i.e., combination of the generally needle-like shape and the generally column-like shape). An average volume Va and an average surface area Sa of the magnetic crystalline particles were confirmed to have the relationship of Sa>about $4.84\ Va^{2/3}$.

SPECIFIC EXAMPLE 2

The magnetic heads produced with the common specification described below under the conditions shown in Table 3 were evaluated in the same manner as in the specific example 1.

TABLE 3

| NO. | Condition | | | Evaluation | | |
|---|---|---|---|---|---|---|
| | Metal magnetic thin film | Metal magnetic thin film on side surfaces? | Recording/ reproduction output | Anti-corrosion characteristic deterioration in output after spraying with salt water) | | Cracking ratio (%) |
| 51 | ✗ | da | Yes | 56dB | | −6dB | 20 |
| 52 | ✗ | cc | Yes | ○ | | ○ | 37 |
| 53 | ✗ | ce | Yes | ○ | | ○ | 30 |
| 54 | ✗ | cg | Yes | ○ | | ○ | 30 |
| 55 | ✗ | db | No | Δ | | Δ | 0 |
| 56 | ✗ | dc | No | x | | x | 0 |
| 57 | ✗ | dd | No | Δ | | Δ | 0 |
| 58 | ✗ | de | No | x | | x | 0 |
| 59 | ✗ | df | No | Δ | | ○ | 0 |
| 60 | ✗ | dg | No | x | | ○ | 0 |
| 61 | | ca | No | ○ | | ○ | 0 |
| 62 | | cb | No | ○ | | ○ | 0 |
| 63 | | cc | No | ○ | | ◎ | 0 |
| 64 | | cd | No | ○ | | ◎ | 0 |
| 65 | | ce | No | ○ | | ◎ | 0 |
| 66 | | cf | No | ○ | | ◎ | 0 |
| 67 | | cg | No | ○ | | ◎ | 0 |

✗: comparative examples
◎: Significantly superior to No. 1
○: Superior to No. 1
Δ: Equivalent to No. 1
x: Inferior to No. 1

In Table 3, compositions of the metal magnetic thin films are indicated with ca through cg and da through dg, which are shown in Table 4.

In Table 3, the evaluation of the recording and reproduction output and the anti-corrosion characteristic and is shown with respect to the conventional magnetic head indicated by No. 1. "X" indicates inferiority as compared to the No. 1 magnetic head. "Δ" indicates equivalence to the No. 1 magnetic head, "○" indicates superiority over the No. 1 magnetic head (i.e., superiority of more than 0 and less than +2 dB), and "◎" indicates significant superiority over the No. 1 magnetic head (i.e., superiority of +2 dB or more).

The evaluation of the cracking ratio is shown with a percentage.

TABLE 4

| | Composition of metal magnetic thin film wt % | dS nm | dL nm |
|---|---|---|---|
| Examples | | | |
| ca | $(Fe_{98}Si_{0.5}Al_{0.5}Ti_1)_{95}O_1N_4$ | 22 | 350 |
| cb | $(Fe_{98}Si_{1.5}Al_{0.2}Ti_{0.3})_{95}O_1N_4$ | 23 | 340 |
| cc | $(Fe_{86}Si_{10}Al_2Ti_2)_{95}O_1N_4$ | 22 | 290 |
| cd | $(Fe_{87.5}Si_9Al_{1.5}Ti_2)_{95}O_1N_4$ | 23 | 350 |
| ce | $(Fe_{85}Si_{10.5}Al_{2.5}Ti_2)_{91}O_1N_8$ | 15 | 160 |
| cf | $(Fe_{76.5}Si_{17}Al_{3.5}Ti_3)_{93}O_2N_7$ | 12 | 120 |
| cg | $(Fe_{83}Si_9Al_3Ti_5)_{93}O_1N_6$ | 18 | 240 |
| Comparative Examples | | | |
| da | $Fe_{73}Si_{18}Al_9$ | 200 | 500 |
| db | $(Fe_{98}Al_{0.5}Ti_{1.5})_{95}O_1N_4$ | 22 | 340 |
| dc | $(Fe_{98}Si_{0.5}Al_{0.5}Ti_1)_{95}O_1N_4$ | 220 | 490 |
| dd | $(Fe_{98}Si_2)_{95}O_1N_4$ | 28 | 360 |

TABLE 4-continued

| | Composition of metal magnetic thin film wt % | dS nm | dL nm |
|---|---|---|---|
| de | $(Fe_{98}Si_{1.5}Al_{0.2}Ti_{0.3})_{95}O_1N_4$ | 180 | 480 |
| df | $(Fe_{70}Si_{25}Al_2Ti_3)_{91}O_1N_8$ | 10 | 150 |
| dg | $(Fe_{86}Si_{10}Al_2Ti_3)_{88}O_2N_{10}$ | 6 | 35 |

In Table 4, compositions ca through cg are represented by $(M_aX_bZ_c)_{100-d}A_d$. M includes at least one magnetic metal element selected from the group consisting of Fe, Co and Ni. X includes at least one element selected from the group consisting of Si and Ge. Z includes at least one element selected from the group consisting of elements of group IVa, elements of group Va and Cr. A includes at least one element selected from the group consisting of O and N.

a, b, c and d fulfill the relationships of:
about $0.1 \leq b \leq$ about 23,
about $0.1 \leq c \leq$ about 8,
a+b+c=100, and
about $1 \leq d \leq$ about 10.

Compositions cc and ce are represented by $(Fe_aSi_bAl_cTi_d)_{100-e-f}N_eO_f$, where a, b, c, d, e and f fulfill the relationships of about $10 \leq b \leq$ about 13, about $1 \leq c \leq$ about 3, about $1 \leq d \leq$ about 3, a+b+c+d=100, about $4 \leq e+f \leq$ about 10, and about $0.1 \leq f \leq$ about 2.

The common specifications mentioned above are as follows.

Head:
Track width: 17 μm
Gap depth: 12.5 μm
Gap length: 0.2 μm
Number of turns: 16
Metal magnetic thin film thickness: 4.5 μm
Underlying layer: alumina; thickness: 2 nm
C/N characteristic:
Relative speed of tape: 10.2 m/s
Recording and reproduction frequency: 20.9 MHz
Tape: MP tape Even when the structure in the magnetic heads in Table 3 (first example) was changed to the structure in the second example, the test results showed a similar tendency to that of Table 3.

Even when Si in Table 4 was changed to Ge, the test results showed a similar tendency to that of Table 3.

Even when Al and Ti in Table 4 were each changed to Ga, Zr, Hf, V, Ta, Nb or Cr, the test results showed a similar tendency to that of Table 3.

As in the specific example 1, the expression "similar tendency" refers to that, for example, although the numerical values of the recording and reproduction output are not exactly the same, but the same evaluation, i.e., "X", "Δ", "○" or "◎" is obtained.

Based on the above-described experimental results, the effects of the present invention were confirmed.

The magnetic crystalline particles of each composition of the metal magnetic thin films were observed to have a generally needle-like shape, a generally column-like shape, or a multiple-branch shape (i.e., combination of the generally needle-like shape and the generally column-like shape). An average volume Va and an average surface area Sa of the magnetic crystalline particles were confirmed to have the relationship of Sa>about $4.84 \, Va^{2/3}$.

SPECIFIC EXAMPLE 3

The magnetic heads in the first example were produced with the common specification described below under the conditions shown in Table 5, and evaluated for the recording and reproduction output and ripple.

TABLE 5

| NO. | Condition | | Evaluation | |
|---|---|---|---|---|
| | Metal magnetic thin film | Underlying layer 2/ Underlying layer 1 | Recording/ reproduction output | Ripple dB |
| 71 | ac | No layer/no layer | 54.5 dB | 2.7 |
| 72 | cc | No layer/no layer | 54.2 dB | 2.9 |
| 73 | ac | No layer/Al$_2$O$_3$ 0.5 nm | ○ | 0.3 |
| 74 | cc | No layer/Al$_2$O$_3$ 0.5 nm | ○ | 0.2 |
| 75 | ac | No layer/Al$_2$O$_3$ 2 nm | ○ | 0.8 |
| 76 | cc | No layer/Al$_2$O$_3$ 2 nm | ○ | 0.7 |
| 77 | ac | No layer/Al$_2$O$_3$ 4 nm | ○ | 1.2 |
| 78 | cc | No layer/Al$_2$O$_3$ 4 nm | ○ | 1.2 |
| 79 | ac | No layer/Al$_2$O$_3$ 10 nm | Δ | 2.4 |
| 80 | cc | No layer/Al$_2$O$_3$ 10 nm | Δ | 2.4 |
| 81 | ac | Condition A 0.5 nm/ Al$_2$O$_3$ 2 nm | ⊚ | 0.8 |
| 82 | cc | Condition A 0.5 nm/ Al$_2$O$_3$ 2 nm | ⊚ | 0.7 |
| 83 | ac | Condition A 1.5 nm/ Al$_2$O$_3$ 2 nm | ⊚ | 0.9 |
| 84 | cc | Condition A 1.5 nm/ Al$_2$O$_3$ 2 nm | ⊚ | 0.9 |
| 85 | ac | Conditlon B 0.5 nm/ Al$_2$O$_3$ 2 nm | ⊚ | 0.8 |
| 86 | cc | Condition B 0.5 nm/ Al$_2$O$_3$ 2 nm | ⊚ | 0.8 |
| 87 | ac | Condition B 2 nm/ Al$_2$O$_3$ 2 nm | ⊚ | 1.0 |
| 88 | cc | Condition B 2 nm/ Al$_2$O$_3$ 2 nm | ⊚ | 0.9 |

TABLE 6

| | Film formation conditions | | | | Average particle |
|---|---|---|---|---|---|
| | Film formation method | Power density | Gas pressure | Flow rate of film forming gas | diamter nm |
| Condition A | RF magnetron sputtering | 15 W/in 2 | 4 mTorr | Ar 75% + Nitrogen 25% | 2 |
| Condition B | RF magnetron sputtering | 15 W/in 2 | 4 mTorr | Ar 85% + Nitrogen 15% | 4 |

In Table 5, compositions of the metal magnetic thin films are indicated with ac and cc, which are shown in Tables 2 and 4.

Figure 1E:
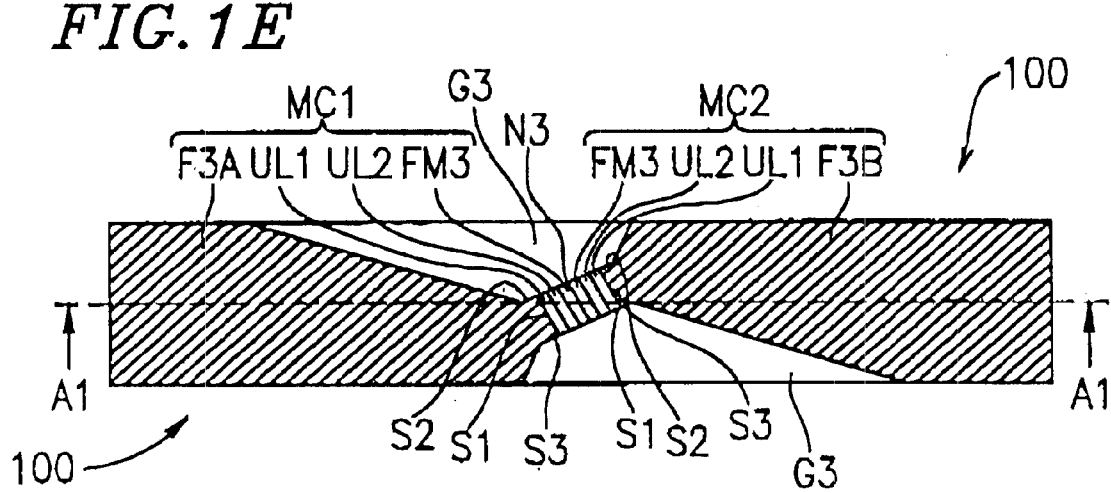
FIG. 1E is a view of a surface of another magnetic head in a first example according to the present invention, on which a recording tape runs.
Figure 4E:
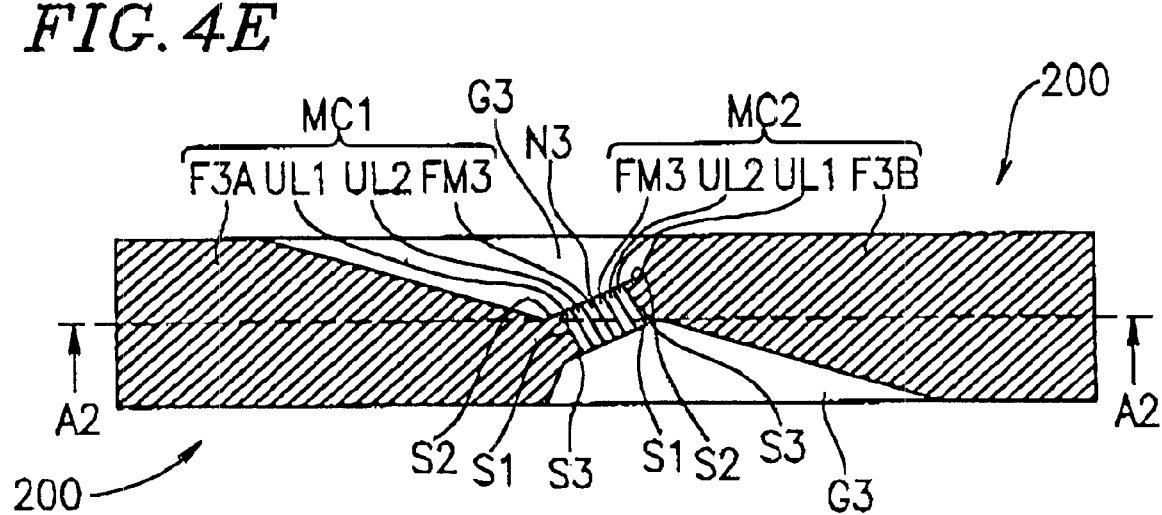
FIG. 4E is a view of a surface of another magnetic head in a second example according to the present invention on which a recording tape runs.

Also in Table 5, "underlying layer 1" refers to a layer in contact with the ferrite section (UL1 in FIGS. 1E and 4E), and "underlying layer 2" refers to a layer in contact with metal magnetic film (UL2 in FIGS. 1E and 4E).

Regarding the magnetic heads indicated with Nos. 73, 75, 77, 79, 81, 83, 85 and 87 in which the metal magnetic film has composition ac, the recording and reproduction output is evaluated with respect to the No. 71 magnetic head with neither underlying layer 1 and 2. "Δ" indicates equivalence to the No. 71 magnetic head, "○" indicates superiority over the No. 71 magnetic head (i.e., superiority of more than 0 and less than +3 dB), and "⊚" indicates significant superiority over the No. 71 magnetic head (i.e., superiority of +3 dB or more).

The evaluation of the ripple is shown with a numerical value.

Table 6 shows the formation conditions of the underlying layer 2 in Table 5. As the target, an alloy target for a metal magnetic thin film was used.

The common specifications mentioned above are as follows.

Head:
  Track width: 17 μm
  Gap depth: 12.5 μm
  Gap length: 0.2 μm
  Number of turns: 16
  Metal magnetic thin film thickness: 4.5 μm
C/N characteristic:
  Relative speed of tape: 10.2 m/s
  Recording and reproduction frequency: 20.9 MHz
Tape: MP tape Even when Al in Table 5 was changed to Si, the test results showed a similar tendency to that of Table 5. Even when nitrogen in Table 6 was changed into oxygen, the test results showed a similar tendency of that of Table 5. Even when compositions ac and cc in Table 5 were respectively changed to any of ca through cb and any of cd through cg, the test results showed a similar tendency to that of Table 5.

As in specific example 1, the expression "similar tendency" refers to that, for example, although the numerical values of the recording and reproduction output are not exactly the same but the same evaluation, i.e., "X", "Δ", "○" or "⊚" is obtained.

Based on the above-described experimental results, the effects of the present invention were confirmed.

The magnetic crystalline particles of each composition of the metal magnetic thin films were observed to have a generally needle-like shape, a generally column-like shape, or a multiple-branch shape (i.e., combination of the generally needle-like shape and the generally column-like shape). An average volume Va and an average surface area Sa of the magnetic crystalline particles were confirmed to have the relationship of Sa>about 4.84 Va$^{2/3}$.

As described above, the present invention provides a magnetic head which is satisfactory in the anti-corrosion characteristic and input and output characteristic and is sufficiently durable against cracking in a base, a method for producing the magnetic head, a video recording and reproduction apparatus including such a magnetic head, and a video camera including such a magnetic head.

The present invention also provides a magnetic head having an optimum combination of a metal magnetic thin film and a head structure.

Various other modifications will be apparent to and can be readily made by those skilled in the art without departing from the scope and spirit of this invention. Accordingly, it is not intended that the scope of the claims appended hereto be limited to the description as set forth herein, but rather than the claims be broadly construed.

What is claimed is:

1. A magnetic head, comprising:
   a pair of magnetic core halves; and
   a nonmagnetic layer provided between the pair of magnetic core halves for combining the pair of magnetic core halves, wherein the pair of magnetic core halves each includes:
  an oxide magnetic base,
    at least one underlying layer provided on the oxide magnetic base, and
    a metal magnetic thin film provided between the underlying film and the nonmagnetic layer, and
  wherein:
    the metal magnetic thin film includes a magnetic film containing, as a major material, magnetic crystalline particles having an average volume Va and an average surface area Sa fulfilling the relationship of Sa>about 4.84 Va$^{2/3}$,
    at least one of the pair of magnetic cores halves has a winding window therein, and
    the metal magnetic thin film is provided in such a manner as to prevent the oxide magnetic base from cracking due to an internal stress generated in the metal magnetic thin film.

2. A magnetic head according to claim 1, wherein the metal magnetic thin film includes magnetic crystalline particles, which have an average length of a longer side of more than about 50 nm.

3. A magnetic head according to claim 2, wherein the magnetic crystalline particles have at least one shape selected from the group consisting of a generally needle-like shape, a generally column-like shape, and a multiple-branch shape including the magnetic crystalline particles of the generally needle-like shape and the generally column-like shape; and the magnetic crystalline particles having the generally needle-like shape and the generally column-like shape have an average length of a shorter side of more than about 5 nm and less than about 60 nm.

4. A magnetic head according to claim 2, wherein, where dS is an average length of a shorter side of the magnetic crystalline particles and dL is an average length of a longer side of the magnetic crystalline particles, about 5 nm<dS<about 60 nm and about 60 nm<dL<about 5000 nm.

5. A magnetic head according to claim 1, wherein the metal magnetic thin film has a composition represented by $(M_a X_b Z_c)_{100-d} A_d$, where M includes at least one magnetic metal element selected from the group consisting of Fe, Co and Ni; X includes at least one element selected from the group consisting of Si, Al, Ga and Ge; Z includes at least one element selected from the group consisting of elements of group IVa, elements of group Va, Al, Ga and Cr; A includes at least one element selected from the group consisting of O and N; and a, b, c and d fulfill the relationships of about $0.1 \leq b \leq$ about 26, about $0.1 \leq c \leq$ about 5, a+b+c=100, and about $1 \leq d \leq$ about 10.

6. A magnetic head according to claim 1, wherein the pair of magnetic core halves each have a combining surface which is combined with the other magnetic core half with the nonmagnetic layer interposed therebetween, a recording medium running surface on which a recording medium runs, and outer side surfaces continuous from the combining surface and from the recording medium running surface; and the metal magnetic thin film is not provided on the outer side surfaces.

7. A magnetic head according to claim 6, wherein the metal magnetic thin film has a composition represented by $(Fe_a Si_b Al_c T_d)_{100-e} N_e$ where T includes at least one element selected from the group consisting of Ti and Ta; and a, b, c, d and e fulfill the relationships of about $10 \leq b \leq$ about 23, about $0.1 \leq d \leq$ about 5, about $0.1 \leq c+d \leq$ about 8, a+b+c+d=100, and about $1 \leq e \leq$ about 10.

8. A magnetic head according to claim 5, wherein Z includes at least one element selected from the group consisting of elements of group IVa, elements of group Va and Cr.

9. A magnetic head according to claim 5, wherein X includes at least one element selected from the group consisting of Si and Ge; and a, b, c and d fulfill the relationships of about $0.1 \leq b \leq$ about 23, about $0.1 \leq c \leq$ about 8, a+b+c=100, and about $1 \leq d \leq$ about 10.

10. A magnetic head according to claim 9, wherein the metal magnetic thin film has a composition represented by $(Fe_a Si_b Al_c Ti_d)_{100-e-f} N_e O_f$ where a, b, c, d, e and f fulfill the relationships of about $10 \leq b \leq$ about 23, about $0.1 \leq d \leq$ about 5, about $0.1 \leq c+d \leq$ about 8, a+b+c+d=100, and about $1 \leq e+f \leq$ about 10, and about $0.1 \leq f \leq$ about 5.

11. A magnetic head according to claim 1, wherein the at least one underlying layer contains at least one of an oxide of Al, an oxide of Si, a nitride of Al, a nitride of Si, and a mixture thereof.

12. A magnetic head according to claim 11, wherein:
  the at least one underlying layer includes a first underlying layer in contact with the magnetic core half and a second underlying layer in contact with the metal magnetic thin film,
  the first underlying layer contains at least one of an oxide of Al, an oxide of Si, a nitride of Al, a nitride of Si, and a mixture thereof,
  the metal magnetic thin film contains at least one of oxygen and nitrogen; and the second underlying layer contains an element which is a main component of the metal magnetic thin film, and at least one of oxygen and nitrogen in a larger amount than the amount contained in the metal magnetic thin film,
  the second underlying layer contains crystalline particles, and
  the crystalline particles have an average particle diameter of about 5 nm or less at least in the vicinity of an interface between the first underlying layer and the second underlying layer.

13. A magnetic head according to claim 12, wherein:
  the first underlying layer contains an oxide of Al, and has a thickness of about 0.5 nm or more and about 4 nm or less,
  the second underlying layer has a thickness of about 0.5 nm or more and about 200 nm or less.

14. A magnetic head according to claim 1, wherein:
  the oxide magnetic base of each of the magnetic core halves contains a ferrite single crystal,
  the ferrite single crystal has a combining surface corresponding to a combining surface of the magnetic core half which is combined with the other magnetic core half with the nonmagnetic layer interposed therebetween, and a recording medium running surface on which a recording medium runs.

15. A magnetic head according to claim 14, wherein the ferrite single crystal includes an MnZn ferrite single crystal containing A mol % of $Fe_2O_3$, B mol % of MnO and C mol % of ZnO, where A, B and C fulfill the relationships of about $52 \leq A \leq$ about 57, about $5 \leq B \leq$ about 29, and about $16 \leq C \leq$ about 21.

16. A magnetic head according to claim 1, wherein:
  the pair of magnetic core halves each have a combining surface which is combined with the other magnetic core half with the nonmagnetic layer interposed therebetween, and a recording medium running surface on which a recording medium runs,
  at least one of the pair of magnetic core halves has a bottom surface and a first inner side surface for forming the winding window, the first inner side surface extends from the bottom surface toward the combining surface and is provided on the side of the recording medium running surface with respect to the bottom surface, and an angle made by the first inner side surface and the combining surface is about 22.5° or more and about 70° or less.

17. A magnetic head according to claim 16, wherein the winding window is provided in one of the pair of magnetic core halves, and the angle made by the first inner side surface and the combining surface is about 45° or more and about 70° or less.

18. A magnetic head according to claim 16, wherein the winding window is provided in both of the pair of magnetic core halves, and the angle made by the first inner side surface and the combining surface is about 22.5° or more and about 50° or less.

19. A magnetic head according to claim 16, wherein:

the first inner side surface includes a second inner side surface adjacent to the combining surface and a third inner side surface adjacent to the bottom surface, an angle made by the second inner side surface and the combining surface is about 22.5° or more and about 70° or less, and an angle made by the third inner side surface and the bottom surface is about 90°.

20. A magnetic head according to claim 19, wherein the winding window is provided in one of the pair of magnetic core halves, and the angle made by the second inner side surface and the combining surface is about 45° or more and about 70° or less.

21. A magnetic head according to claim 19, wherein the winding window is provided in both of the pair of magnetic core halves, and the angle made by the second inner side surface and the combining surface is about 22.5° or more and about 50° or less.

22. A magnetic head according to claim 1, wherein the metal magnetic thin film has a composition represented by $(Fe_a Si_b Al_c Ti_d)_{100-e-f} N_e O_f$, where a, b, c, d, e and f fulfill the relationships of about $10 \leq b \leq$ about 13, about $1 \leq c \leq$ about 3, about $1 \leq d \leq$ about 3, $a+b+c+d=100$, about $4 \leq e+f \leq$ about 10, and about $0.1 \leq f \leq$ about 2.

23. A magnetic head according to claim 1, wherein:

the oxide magnetic base of each of the magnetic core halves has a combining surface which is combined with the oxide magnetic base of the other magnetic core half with the nonmagnetic layer interposed therebetween, and side surfaces continuous from the combining surface, an angle made by the combining surface and each of the side surfaces is about 70° or more and about 90° or less, and the metal magnetic thin film is provided on the combining surface but is not provided on the side surfaces.

24. A video recording and reproduction apparatus, comprising:

a cylinder having a magnetic head according to claim 1 mounted thereon;

a head/tape interface mechanism for winding a magnetic tape around the cylinder;

a cylinder driving section for driving the cylinder; and a magnetic tape driving section for driving the magnetic tape wound around the cylinder.

25. A video camera, comprising:

a cylinder having a magnetic head according to claim 1 mounted thereon;

a head/tape interface mechanism for winding a magnetic tape around the cylinder;

a cylinder driving section for driving the cylinder;

a magnetic tape driving section for driving the magnetic tape wound around the cylinder;

an optical system for converting a video signal into an electric signal; and a signal processing circuit for outputting the electric signal obtained by conversion by the optical system to the magnetic head.

* * * * *